US011516521B2

(12) United States Patent
da Silva Pratas Gabriel et al.

(10) Patent No.: US 11,516,521 B2
(45) Date of Patent: Nov. 29, 2022

(54) GENERATING COMPOSITE VIDEO STREAM FOR DISPLAY IN VR

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Alexandre da Silva Pratas Gabriel, The Hague (NL); Mattijs Oskar Van Deventer, Leidschendam (NL); Hans Maarten Stokking, Wateringen (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 17/262,598

(22) PCT Filed: Jul. 29, 2019

(86) PCT No.: PCT/EP2019/070397
§ 371 (c)(1),
(2) Date: Jan. 22, 2021

(87) PCT Pub. No.: WO2020/025558
PCT Pub. Date: Feb. 6, 2020

(65) Prior Publication Data
US 2021/0266613 A1  Aug. 26, 2021

(30) Foreign Application Priority Data

Jul. 30, 2018 (EP) .................................. 18186331

(51) Int. Cl.
*H04N 21/234* (2011.01)
*H04N 13/178* (2018.01)
(Continued)

(52) U.S. Cl.
CPC ..... *H04N 21/23412* (2013.01); *H04N 13/161* (2018.05); *H04N 13/178* (2018.05);
(Continued)

(58) Field of Classification Search
CPC .......... H04N 21/23412; H04N 13/178; H04N 13/161; H04N 21/23614; H04N 21/8455; H04N 21/85406
See application file for complete search history.

(56) References Cited

U.S. PATENT DOCUMENTS 6,574,360 B1    6/2003  Berdardini et al.
10,397,666 B2   8/2019  Thomas
(Continued)

FOREIGN PATENT DOCUMENTS

EP          2 408 193 A2    1/2012
WO     WO2017/029400 A1    2/2017
(Continued)

OTHER PUBLICATIONS

International Search Report and Written Opinion for International Application No. PCT/EP2019/070397, entitled Generating Composite Video Stream For Display in VR, consisting of 2 pages. Dated Aug. 19, 2019.
(Continued)

*Primary Examiner* — Mishawn N. Hunter
(74) *Attorney, Agent, or Firm* — Hamilton, Brook, Smith & Reynolds, P.C.

(57) ABSTRACT

A processor system and computer-implemented method may be provided for generating a composite video stream which may combine a background video and a foreground video
(Continued)

stream into one stream. For that purpose, a spatially segmented encoding of the background video may be obtained, for example in the form of a tiled stream. The foreground video stream may be received, for example, from a(nother) client device. The foreground video stream may be a real-time stream, e.g., when being used in real-time communication. The image data of the foreground video stream may be inserted into the background video by decoding select segments of the background video, inserting the foreground image data into the decoded background image data of these segments, and by encoding the resulting composite image data to obtain composite segments which, together with the non-processed segments of the background video, form a spatially segmented encoding of a composite video.

16 Claims, 19 Drawing Sheets

(51) Int. Cl.
    *H04N 13/161*     (2018.01)
    *H04N 21/236*     (2011.01)
    *H04N 21/845*     (2011.01)
    *H04N 21/854*     (2011.01)

(52) U.S. Cl.
    CPC ... *H04N 21/23614* (2013.01); *H04N 21/8455* (2013.01); *H04N 21/85406* (2013.01)

(56) References Cited

U.S. PATENT DOCUMENTS

| | | | |
|---|---|---|---|
| 10,674,185 B2 | 6/2020 | Thomas | |
| 10,694,192 B2 | 6/2020 | Thomas | |
| 10,715,843 B2 | 7/2020 | Van Brandenburg | |
| 10,721,530 B2 | 7/2020 | Van Brandenburg | |
| 2008/0168512 A1* | 7/2008 | Nguyen | H04N 21/2668 725/105 |
| 2008/0212942 A1 | 9/2008 | Gordon et al. | |
| 2015/0281698 A1 | 10/2015 | Zhao et al. | |
| 2017/0180793 A1 | 6/2017 | Cremer et al. | |
| 2018/0103199 A1 | 4/2018 | Hendry et al. | |
| 2018/0242028 A1 | 8/2018 | Van Brandenburg et al. | |
| 2018/0262714 A1* | 9/2018 | Kim | H04N 7/147 |
| 2019/0082118 A1* | 3/2019 | Wang | H04N 5/23229 |
| 2020/0162745 A1 | 5/2020 | Hindriks et al. | |

FOREIGN PATENT DOCUMENTS

| | | |
|---|---|---|
| WO | WO 2017/103065 A1 | 6/2017 |
| WO | WO2017/114821 A1 | 7/2017 |
| WO | WO 2018/150083 A1 | 8/2018 |
| WO | WO 2019/002559 A1 | 1/2019 |

OTHER PUBLICATIONS

M. S. A. H. Peter Amon, "Compressed Domain Stitching of HEVC Streams for Video Conferencing Applications," International Packet Video Workshop, Munich (2012).

Ochi, Daisuke, et al. "Live streaming system for omnidirectional video", Virtual Reality (VR), IEEE (2015).

Misra, K., et al., "An Overview of Tiles in HEVC," IEEE Journal of Selected Topics in Signal Processing, vol. 7, No. 6, pp. 969-977 (2013).

Sanchez, Y., et al., "Low Complexity Cloud-video-Mixing Using HEVC," CCNC, No. 11, pp. 213-218 (2014).

Hirose et al., "Integrating Live Video For Immersive Environments", IEEE Multimedia 6.3, pp. 14-22 (1999).

Prins, M. J., et al., "Together VR: A Framework for Photo-Realistic Shared Media Experiences in 360-Degree VR" International Broadcasting Conference, (2017).

Greene, et al., "Hierarchical Z-Buffer Visibility," ACM Computer Graphics. 27.10.1145/166117.166147 (1993).

Sánchez, Y., et al. "Compressed Domain Video Processing For Tile Based Panoramic Streaming Using HEVC, " ImmersiveME '15: Proceedings of the 3rd International Workshop on Immersive Media Experiences; pp. 13-18 (Oct. 2015).

* cited by examiner

GENERATING COMPOSITE VIDEO STREAM FOR DISPLAY IN VR

This application is the U.S. National Stage of International Application No. PCT/EP2019/070397, filed Jul. 29, 2019, which designates the U.S., published in English, and claims priority under 35 U.S.C. § 119 or 365(c) to EP Application No. 18186331.7, filed Jul. 30, 2018. The entire teachings of the above applications are incorporated herein by reference.

FIELD OF THE INVENTION

The invention relates to a method and processor system for generating a composite video stream for being displayed by a client device, for example in a VR environment. The invention further relates to a computer program comprising instructions for carrying out the method. The invention further relates to a computer readable medium comprising placement metadata for use in generating the composite video stream. The invention further relates to a processor system representing the client device for rendering the composite video stream in the VR environment.

BACKGROUND ART

Virtual Reality (VR) involves the use of computer technology to simulate a user's physical presence in a virtual environment. Typically, VR rendering devices make use of Head Mounted Displays (HMD) to render the virtual environment to the user, although other types of VR displays and rendering techniques may be used as well, including but not limited to holography and Cave automatic virtual environments.

VR may be used to render scenes which are represented by three-dimensional (3D) graphics, e.g., defined as a set of vertices, edges, faces, etc.

However, in many cases, it may be desirable to render a video-based representation of a scene in VR. For example, the video may be a video recording of a real-life scene, or a video obtained by Computer-Generated Imagery (CGI) of a virtual scene, etc. In some cases, the video may represent an omnidirectional video which may provide a large field of view of the scene, e.g., allowing a user to 'look around' within the scene. The rendering of such a video-based representation of a scene may involve projecting the image data of the video onto a virtual body, such as a sphere, and then rendering from a viewpoint within or facing the virtual body.

For example, in a multiuser communication session in VR, an omnidirectional video of a tropical island may be used as a 'virtual backdrop' for the multiuser communication session by projecting the video onto the inside of a sphere and placing avatars representing the users of the multiuser communication session inside the sphere, thereby providing each user with a view of the other participants on the island. Another example is a 'Social VR' session in which an omnidirectional video of a cinema showing a movie is used as a 'virtual setting' and in which users are represented as avatars in the cinema which may together watch the movie.

In the above examples, the video-based representation of the scene may represent a background for 'foreground' objects, such as the aforementioned avatars, with the latter being perceived as being placed before the background from a viewpoint of a user in the VR environment. In certain scenarios, the foreground object may show a video stream.

An example of such a video stream may, when displayed, provide a real-time video-based representation of another user, e.g., a so-called video avatar as described by [1]. Such a video stream may be shown in front of a background, e.g., as described by [2], albeit with an image-based background instead of a video. The earlier described avatars placed before a background video may thus be video avatars.

A disadvantage of such scenarios is that a client device may receive multiple streams, namely a video stream representing the background video and a foreground video stream representing, for example, a real-time recording of another user which is to be displayed in front of the background video in the VR environment.

Namely, it may be challenging for the client device to receive and decode multiple video streams simultaneously. For example, lower-end VR devices such as lower-end smartphones may only have one hardware decoder allowing only one video stream to be hardware decoded. The other streams may be software decoded which is typically (much) more computationally complex. This problem may be aggravated in cases where several foreground video streams are to be displayed in front of the background video in the VR environment, e.g., one for each of the other participants in a conference call.

A related problem may be the relatively large number of streams which may need to be exchanged in a multiuser communication session in VR which uses 'video avatars'. Namely, for a N-user multiuser communication session, each client device may receive N incoming streams, namely one representing the background video (which may typically be provided by a central server) and N−1 streams of the other users, while additionally having to stream the recording of the respective user to each of the other client devices as N−1 outgoing streams. This may represent a burden to the client device, for example as sufficient bandwidth has to be available and allocated and as network sessions have to be maintained to each of the other client devices.

Although the above problem is described for multiuser communication in VR, a same or similar problem may occur in other scenarios in which a foreground video stream is to be displayed in front of a background video in VR or in any other non-VR type of display environment, such as a simple full-screen or windowed display. For example, the background video stream may represent a video of a cinema setting which shows other users seated in the cinema, e.g., looking at the screen, eating popcorn, etc., while the actual movie to be shown is provided by a separate video stream which is to be overlaid over the (empty) screen in the background video.

REFERENCES

[1] Hirose et al., "*Integrating live video for immersive environments*", IEEE Multimedia 6.3, 1999, pp. 14-22.
[2] M. J. Prins, S. Gunkel and O. Niamut, "*TogetherVR: A Framework for Photo-Realistic Shared Media Experiences in 360-Degree VR*" in International Broadcasting Conference, 2017.

SUMMARY OF THE INVENTION

It would be advantageous to enable a client device to display a background video and a foreground video stream at a reduced computational complexity, for example compared to the decoding of a background video stream and a separate foreground video stream.

In accordance with a first aspect of the invention, a method may be provided for generating a composite video stream for being displayed by a client device. The method may comprise one or more of the following steps:

obtaining a spatially segmented encoding of a background video, said segmented encoding comprising independently decodable background segments;

receiving at least one foreground video stream at least part of which is to be displayed in front of the background video;

determining a placement position of the foreground video stream relative to the background video;

identifying a subset of background segments which are partially or entirely occluded by the foreground video stream when the foreground video stream is displayed at the placement position;

generating the composite video stream for the client device by, for a respective output frame of the composite video stream and respective input frames of the background video and the foreground video stream:

selectively decoding the subset of background segments, thereby obtaining decoded background image data, compositing image data of the foreground video stream into the decoded background image data, thereby obtaining composite image data, and encoding the composite image data to obtain a set of independently decodable composite segments which, together with the background segments which are not in the subset of background segments, represent a spatially segmented encoding of the output frame of the composite video stream; and streaming the composite video stream, or select spatial segments of the composite video stream, to the client device.

In accordance with a further aspect of the invention, a transitory or non-transitory computer-readable medium may comprise a computer program which may comprise instructions for causing a processor system to perform the method.

In accordance with a further aspect of the invention, a processor system may be provided which may be configured for generating a composite video stream for being displayed by a client device. The processor system may comprise:

a network interface to a network;

an input interface for obtaining a spatially segmented encoding of a background video, said segmented encoding comprising independently decodable background segments;

a processor configured to perform one or more of:

via the network interface, receive at least one foreground video stream at least part of which is to be displayed in front of the background video;

determine a placement position of the foreground video stream relative to the background video;

identify a subset of background segments which are partially or entirely occluded by the foreground video stream when the foreground video stream is displayed at the placement position;

generate the composite video stream for the client device by, for a respective output frame of the composite video stream and respective input frames of the background video and the foreground video stream:

selectively decode the subset of background segments, thereby obtaining decoded background image data, composite image data of the foreground video stream into the decoded background image data, thereby obtaining composite image data, and encode the composite image data to obtain a set of independently decodable composite segments which, together with the background segments which are not in the subset of background segments, represent a spatially segmented encoding of the output frame of the composite video stream; and via the network interface, stream the composite video stream, or select spatial segments of the composite video stream, to the client device.

In accordance with a further aspect of the invention, a processor system may be provided which may represent a client device configured to render a VR environment. The processor system may comprise:

a network interface to a network;

a processor configured to, via the network interface:

obtain a real-time recording of a user of the client device and stream the real-time recording as a video stream to a select processor system;

receive a composite video stream, or select spatial segments of the composite video stream, from the select processor system, the composite video stream being a spatially segmented encoding comprising a real-time recording of a user of another client device composited onto a background video;

the processor being further configured to perform one or more of:

decode at least part of the segments of the composite video stream, thereby obtaining decoded composite image data; and render the decoded composite image data from a viewing position in the VR environment.

In accordance with a further aspect of the invention, a computer-implemented method may be provided for rendering a VR environment. The method may comprise, for example at a client device:

obtaining a real-time recording of a user of the client device and stream the real-time recording as a video stream to a select processor system;

receiving a composite video stream, or select spatial segments of the composite video stream, from the select processor system, the composite video stream being a spatially segmented encoding comprising a real-time recording of a user of another client device composited onto a background video;

decoding at least part of the segments of the composite video stream, thereby obtaining decoded composite image data; and rendering the decoded composite image data from a viewing position in the VR environment.

The above measures may involve generating a composite video stream which may combine the background video and a foreground video stream into one stream. For that purpose, a spatially segmented encoding of the background video may be obtained, for example in the form of a tiled stream. The foreground video stream may be received, for example, from a(nother) client device. The foreground video stream may be a real-time stream, e.g., when being used in real-time communication.

The foreground video stream may then be 'inserted' into the background video by compositing the image data of the foreground video stream into the image data of the background video. For that purpose, a placement position of the foreground video stream may be determined which may indicate where the foreground video stream is to be placed relative to the background video, for example when both are displayed in the VR environment but also in any other type of display. Such a placement position may be predefined or may dynamically change, for example if the foreground video stream represents a real-time recording of another user and the placement position is to correspond to a position of the user in the VR environment. The compositing itself may take various forms, such as a simple overwriting or blending of image elements (e.g., pixels) but may also include more advanced processing.

In this respect, it is noted that, in general, not all of the foreground video stream may be 'inserted' into the background, but rather only a part of the foreground video stream, which may be a substantial part. Any references to 'insertion', 'compositing', 'display', etc. of the foreground video stream is to be understood as including said actions applied to only a (substantial) part of the video stream. For example, if a foreground video stream contains a recording of a user and his/her immediate surroundings, only the image data of the user may be inserted into the background video while omitting inserting the image data of his/her surroundings.

In general, the foreground video stream may be more dynamic than the background video stream. Hence, the foreground video stream may be provided in real-time, whereas the background video stream may be pre-recorded. However, this is not a limitation, as the background video stream may also be obtained in real-time, e.g., be live recorded, and/or the foreground video stream may alternatively be pre-recorded.

Also, the terms 'foreground' and 'background' are not technically limiting with respect to the (semantic) content of the respective streams/videos, but rather refer to a display order in that the foreground video stream is to be displayed 'in front of' the background video. For example, typically a background video stream may contain the background of a scene, but a background video stream may also comprise one or more foreground objects. As a specific example, in a VR conference setting the background video stream may provide a background of the conference room and a table in the foreground, whereas the foreground video stream(s) may comprise the real-time video stream(s) of the user(s) that participate in the VR conference.

As the spatial dimensions of the background video may be relatively large compared to the spatial size at which the foreground video stream is to be displayed before the background video, the background video may be specifically obtained in a spatially segmented form. Namely, specific segments may be identified in which the foreground video stream occludes the background when displayed, e.g., in a VR environment. These specific segments may then be processed, e.g., by decoding, compositing the image data and re-encoding the composite image data. The composite video stream may then be generated, with the segments of the composite video stream being formed of the composite ('re-encoded') segments and the remaining background segments (which have not been processed by decoding, compositing and re-encoding). The composite video stream may then be streamed to the client device, either in its entirety or as select spatial segments, e.g., only those which are visible to a user of the client device given the user's current field of view in a VR environment (the latter concept also being known in VR as 'tiled streaming', in particular for streaming what is known as the 'viewport').

Compared to a client device having to receive two or more separate video streams, e.g., a background video stream and at least one foreground video stream, the above measures may provide several advantages to the client device. For example, the client device may only have to decode the composite video stream and thereby fewer video streams. This may provide compatibility with client devices having only one hardware decoder. Moreover, the composite video stream may omit the parts of the background which are occluded by the foreground video stream, and may thus be smaller in size than a background video stream and an additional foreground video stream (as the former contains image data which will be occluded by the latter when displayed, e.g., in a VR environment). This may reduce the computational complexity of decoding and bandwidth and storage requirements for receiving and buffering. Moreover, if there are several foreground video streams which are inserted centrally by an entity, such as the aforementioned processor system, the client device would only need to receive and decode the composite video stream instead of having to receive and decode the foreground video streams separately, possibly from different entities.

The bandwidth advantages may also apply to the (access) network by which the composite video stream is transmitted to the client device.

From the perspective of the processor system performing the compositing, the segmented encoding of the background may significantly reduce the computational complexity of the compositing as the background video may only be selectively processed (by decoding, compositing and re-encoding) since only those segments of the background video may be processed in which the background is occluded by the foreground video stream when displayed, e.g., in a VR environment. Since the background video may be relatively large, for example providing a 180-degree or 360-degree high-resolution view of a scene, only a small part of the segments may have to be processed. This may reduce the computational complexity, but also the latency caused by the processing. The latter may be particularly relevant if the foreground video stream is used for communication purposes, for example when representing a real-time recording of another user, as latency may disturb the communication.

In an embodiment, the client device may be configured to display the composite video stream in a VR environment and render the VR environment from a viewing position of a user, and the method may further comprise:
  determining the viewing position of the user, for example by receiving data indicative of the viewing position from the client device; and
  identifying the subset of background segments which are partially or entirely occluded by the foreground video stream further based on the viewing position.

The composite video stream may be generated taking into account the viewing position of a user of the client device in a VR environment, for which user the composite video stream is generated. Here and elsewhere, it is to be understood that "of the user" may technically correspond to the provision of a user-adjustable parameter and the provision of a mechanism for the user to adjust said parameter.

The viewing position may be characterized in various ways, e.g., as a 2D or 3D position in the VR environment. If the foreground video stream is not to be 'glued' onto the background video but rather to be represented in the VR environment as a separate object which is to be placed in front of the object representing the background video (e.g., the surrounding sphere), the viewing position may determine which parts of the background video are occluded by the foreground video stream, and thereby also which spatial segments of the background video are to be processed (by decoding, compositing and re-encoding). By taking the viewing position of the user of the client device into account, the composite video stream may show the foreground video stream composited onto the background video in a way which at least coarsely matches the viewing position of the user in the VR environment. It may thus not be needed for the client device to represent the foreground video stream as a separate object in the VR environment. Rather, it may suffice for the client device to display the background video (e.g., on an inner surface of a surrounding sphere) which may provide the user with a similar visual impression as if the foreground video stream where to be shown as a separate object.

It is noted that the viewing position of the user may be determined in various ways, for example by receiving data indicative of the viewing position from the client device. Such data may be received only once, e.g., before starting to generate the composite video stream, or regularly, e.g., reflecting a current viewing position of the user. However, the viewing position may also be estimated or predetermined, e.g., corresponding to one of a limited number of viewing positions, or simply fixed.

In an alternative embodiment, in a multi-user communication scenario in which multiple foreground video streams are received which each represent a real-time recording of a different user, in which these recordings are to be inserted at respective placement positions in the background video, and in which the placement positions may be logically arranged (for example from left-to-right and labelled A, B, C), the viewing position may indicate which recordings are to be placed at which placement positions so as to obtain a consistent placement of users across several composite video streams which are generated for several client devices in the same or similar manner. For example, if three placement positions are provided for the recordings of users 2-4 and if the placement positions are horizontally labelled A, B and C, the viewing position may indicate that the present user ('1') sits to the left of user 2, opposite of user 3 and to the right of user 4 in a circle. Accordingly, the recording of user 2 may be placed at placement position A, the recording of user 3 may be placed at placement position B, and the recording of user 4 may be placed at placement position C. Similarly, if a composite video stream is to be generated for the client device of user 2 in a same or similar manner, the viewing position may indicate that the present user ('2') sits to the left of user 3, opposite of user 4 and to the right of user 1.

In an embodiment, the method may further comprise obtaining placement metadata associated with the spatially segmented encoding of the background video, wherein the placement metadata may define the placement position of the foreground video stream relative to the background video. The placement position of the foreground video stream relative to the background video may be defined by metadata which may be associated with the background video. For example, the metadata may define a limited number of placement positions relative to the background video which may match the image contents of the background video. For example, if the background video shows a cinema with one or more empty seats and if the foreground video stream is a real-time recording of another user, the placement metadata may define one or more placement positions which would place the video of the other user in the place of an empty seat in the composite video stream. Likewise, if the foreground video stream represents a movie, the placement metadata may define the position of the (otherwise) empty screen in the cinema on top of which the foreground video stream is to be displayed. Such a placement position may for example be a 2D position in a spatial coordinate system of the background video, e.g., defining where the foreground video stream is to be inserted into the background video.

In some embodiments, the placement metadata may further indicate a size at which the foreground video stream is to be inserted into the background video.

In other embodiments, the placement position may be 2D or 3D position in a VR environment, for example, if the foreground video stream is meant to be represented as a separate object in a VR environment. For example, if the foreground video stream shows a real-time recording of another user, the placement position of the foreground video stream in the VR environment may correspond to a viewing position of the other user in the VR environment. Such a viewing position may be received as data once or regularly from a client device of the other user.

In an embodiment, the spatially segmented encoding of the background video may be obtained as a bitstream, and the method may further comprise:
  replacing the subset of background segments with the set of composite segments in the bitstream to obtain the spatially segmented encoding of the output frame of the composite video stream.

The composite video stream may thus be obtained by replacing select segments of the bitstream of the background video, namely those which are processed by decoding, compositing and re-encoding, with the segments which are obtained by said processing and thereby contain the image data of the foreground video stream.

In an embodiment, the encoding of the composite image data may comprise encoding the composite image data at a higher bitrate than the bitrate at which the subset of background segments was encoded. The foreground video stream may represent a region of interest for a user of the client device. By encoding the composite image data at a higher bitrate, or in general at a higher quality level, the image/video quality of the segments which represent this region of interest may be increased compared to segments containing only background video.

In an embodiment, the spatially segmented encoding of the background video may contain a map projection of the background video, such as an equirectangular projection, and the method may further comprise:
  compositing the image data of the foreground video stream into the decoded background image data based on the map projection.

For example, compositing the image data of the foreground video stream into the decoded background image data may comprise applying the map projection to the image data of the foreground video stream before or when said image data is composited into the decoded background image data.

In another example, said compositing may comprise:
  applying a reverse map projection to the decoded background image data;
  compositing the image data of the foreground video stream into the decoded background image data, thereby obtaining composite image data; and
  applying the map projection to the composite image data.

By applying a reverse map projection to the decoded background image data, the map projection may be temporarily 'undone', thereby allowing the image data of the foreground video stream to be directly inserted without a map projection.

In an embodiment, the client device may be configured to display the composite video stream in a VR environment and to render the VR environment in a field of view which is determinable by the user, and the method may further comprise:

determining the field of view of the user in the VR environment; and compositing the image data of the foreground video stream into the decoded background image data based on the field of view.

In many cases, the client device may only render a VR environment in a particular field of view (also referred to as Viewport) which may be smaller than the overall field of view provided by the VR environment, the latter being typically a 360-degree field of view. As parts of the VR environment may not be visible to the user at a given moment in time, this may be taken into account when compositing the image data of the foreground video stream into the decoded background image data. For example, compositing the image data of the foreground video stream into the decoded background image data based on the field of view may comprise at least one of:

only compositing the image data of the foreground video stream if said image data is in the field of view of the user; and compositing the image data of the foreground video stream at a reduced image quality if said image data is outside of the field of view of the user.

It is noted that the client device may use 'tiled streaming' or similar techniques to only selectively stream spatial segments which are within the field of view (and/or within a narrow 'sideband' around the field of view) of the user. The requested segments may therefore be indicative of the current field of view of the client device.

In an embodiment, at least one of the spatially segmented encoding of the background video and the spatially segmented encoding of the composite video stream may be represented by a tile-based media stream. Here and elsewhere, 'tiled streaming' or 'tile-based media stream' may refer to techniques such as [3] and/or [4] (see 'Further references'). Briefly speaking, a Spatial Relationship Description (SRD) or similar data may describe the relationship between tiles, for example in an MPD (Media Presentation Description) or similar data. Tiles may then be requested individually by the client device, for example those in the current field of view of the user.

In an embodiment, the method may comprise:

receiving a real-time foreground video stream from each one of a set of client devices, each respective foreground video steam representing a real-time recording of a respective user of a respective client device;

for each one of the client devices, generating a composite video stream which comprises image data of the foreground video streams received from the other client devices composited into the background video at respective placement positions.

The above embodiment may reflect a 'social', e.g., 'Social VR' use case in which each client device may stream a real-time recording of a respective user to a central entity, such as the processor system performing the method. For each of the client devices, a separate composite video stream may be generated which shows the foreground video streams of the other client devices at respective placement positions.

In some embodiments, each composite video stream may reflect the viewing position of a user of a respective client device in a VR environment, which may be correspond to or may be consistent with the placement position of the foreground video stream of the particular user in the other composite video streams.

In an embodiment, the method may be performed by a client device or by a server, such as an edge node, e.g. in a 5G or next generation telecommunication network—systems that are very low-delay and are optimized for these kind of media exchanges. The client device may be a different client device than the client device for which the composite video stream is generated. For example, in the aforementioned social (VR) use case, one of the client devices may be configured to perform the method.

It will be appreciated by those skilled in the art that two or more of the above-mentioned embodiments, implementations, and/or aspects of the invention may be combined in any way deemed useful.

Modifications and variations of the method, the processor system(s), the metadata and/or the computer program, which correspond to the modifications and variations described for another one of said entities, can be carried out by a person skilled in the art on the basis of the present description.

FURTHER REFERENCES

[3] Ochi, Daisuke, et al. "*Live streaming system for omnidirectional video*", Virtual Reality (VR), 2015 IEEE

[4] K. Misra, A. Segall, M. Horowitz, S. Xu and A. Fuldseth, "*An Overview of Tiles in HEVC*" IEEE Journal of Selected Topics in Signal Processing, vol. 7, no. 6, pp. 969-977, 2013.

[5] Y. Sanchez, R. Globisch, T. Schierl and T. Wiegand, "*Low Complexity Cloud-video-Mixing Using HEVC*" CCNC, no. 11, pp. 213-218, 2014.

[6] M. S. A. H. Peter Amon, "*Compressed Domain Stitching of HEVC Streams for Video Conferencing Applications*" in International Packet Video Workshop, Munich, 2012.

BRIEF DESCRIPTION OF THE DRAWINGS

These and other aspects of the invention are apparent from and will be elucidated with reference to the embodiments described hereinafter. In the drawings.

Figure 1:
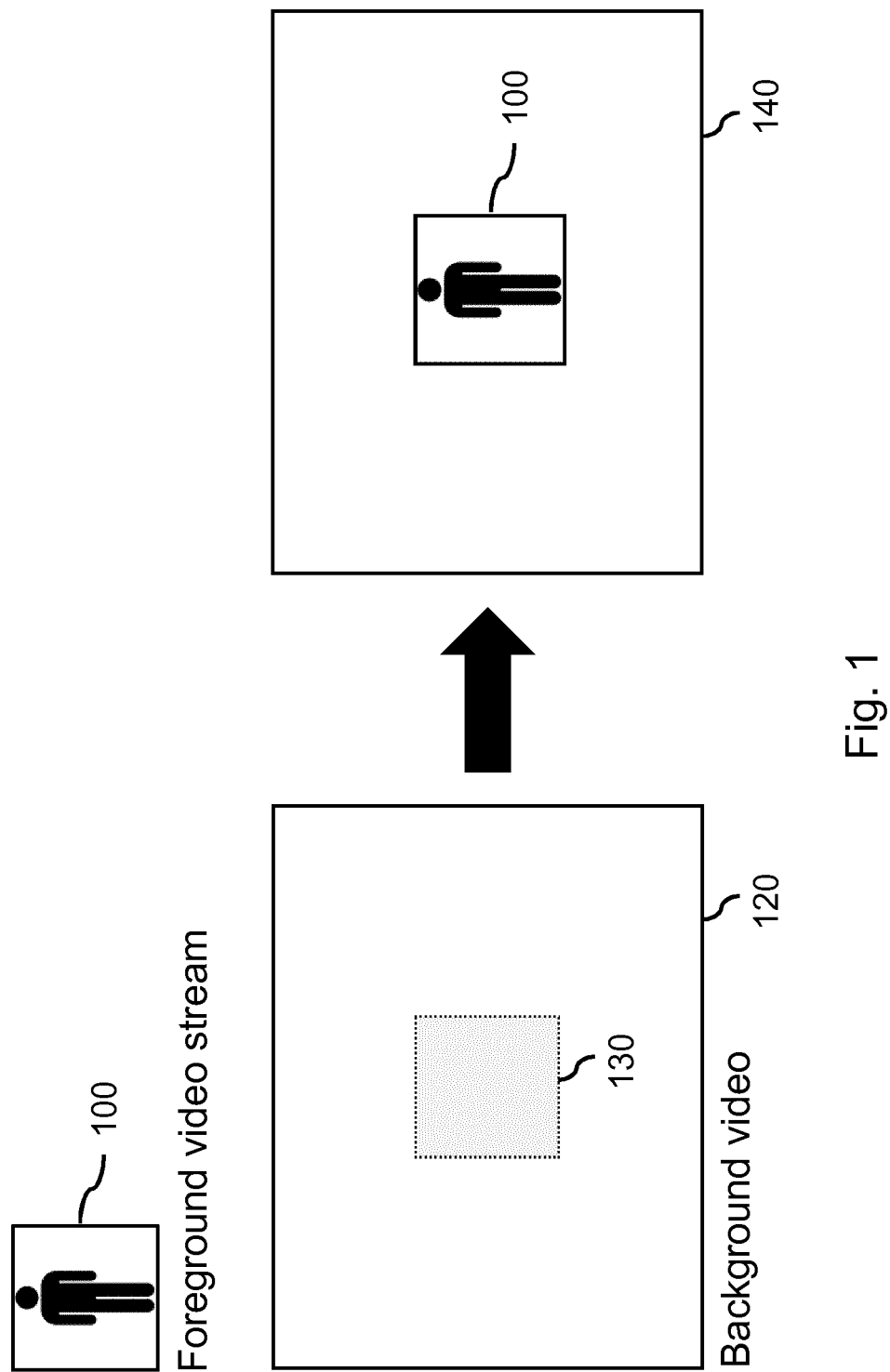
FIG. 1 shows a foreground video displayed in front of a background video, thereby occluding a part of the background video.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

| | |
|---|---|
| 100-103 | foreground video (camera recording of person) |
| 110 | foreground video (subtitles) |
| 120 | background video |
| 130 | area occluded by foreground video |
| 140 | merging of foreground video and background video |
| 150 | segmented encoding of background video |
| 160 | background segments to be decoded |
| 170 | segmented encoding of composite video |
| 180 | composite segments containing foreground video |
| 200 | prior art server |
| 210-213 | prior art client devices |
| 220 | foreground video streams transmitted by client device |
| 230 | background video streams transmitted to client devices |
| 250 | server |
| 260-263 | client devices |
| 270 | foreground video streams received from client devices |
| 280 | composite video streams transmitted to client devices |
| 300 | arrangement of users |
| 310-313 | inconsistent arrangement between users |
| 320-323 | consistent arrangement between users |
| 400-408 | segmented encoding of composite video |
| 410 | composite segments containing foreground video |
| 500 | background video A |
| 510 | background video B |
| 501-503 | placement positions relative to background video A |
| 511-513 | placement positions relative to background video B |
| 600 | server |
| 610 | composite video stream |
| 615 | foreground video stream |
| 630 | network |
| 640 | processor system |
| 650 | head mounted display |
| 655 | rendered image data |
| 660 | camera |
| 665 | camera data |
| 670 | background video |
| 675 | data container |
| 680 | placement metadata |
| 700 | processor system |
| 710 | network interface |
| 712 | network data communication |
| 720 | processor |
| 730 | storage |
| 800 | processor system |
| 810 | network interface |
| 812 | network data communication |
| 820 | processor |
| 830 | camera input |
| 832 | camera data |
| 835 | camera |
| 840 | display output |
| 842 | display data |
| 845 | display |
| 900 | method of generating composite video stream |
| 910 | obtaining spatially segmented encoding of background video |
| 915 | receiving foreground video stream |
| 920 | determining placement position of foreground video stream |
| 925 | identifying subset of background segments |
| 930 | generating composite video stream |
| 950 | computer readable medium |
| 960 | non-transitory data |
| 1000 | exemplary data processing system |
| 1002 | processor |
| 1004 | memory element |
| 1006 | system bus |
| 1008 | local memory |
| 1010 | bulk storage device |
| 1012 | input device |
| 1014 | output device |
| 1016 | network adapter |
| 1018 | application |

DETAILED DESCRIPTION OF EMBODIMENTS

The following embodiments relate to the transmitting and combining of videos, for example by a server, and may allow multiple videos to be combined into a output video in a computationally efficient manner by exploiting spatially segmented encoding techniques, which are for example used in high-resolution videos such as 360-degree videos. The embodiments may be advantageously applied in video-based multi-user communication, for example in 'Social VR' where a number of users may participate in a teleconference using Head Mounted Displays (HMDs) and cameras.

However, the techniques described in this specification may also be applied in all other applications in which a foreground video stream is to be inserted into a background video and in which the foreground video stream then covers ('occludes') a part of the background video. A non-limiting example is the insertion of a video stream containing 'hard-coded' subtitles onto a primary video, such as a movie or TV show.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame.

FIG. 1 shows a prior art way of combining a foreground video stream 100 with a background video 120. The foreground video stream 100 may be locally inserted into the background video 120, thereby occupying a part 130 of the background video in the output video 140. The part 130 may be a relatively small part, for example less than 50% or 25% of the overall area of the background video. The insertion of the foreground video stream 100 may be performed on a frame-by-frame basis, in that a frame of the foreground video stream 100 may be inserted into a respective frame of the background video 120, with this process being repeated for consecutive input frames to produce consecutive output frames. Disadvantageously, the insertion of a frame of the foreground video stream 100 into a respective frame of the background video 120 may necessitate the background video frame to be decoded in its entirety, as the background video is typically received and/or stored in an encoded form, e.g., using video coding techniques such as MPEG-2 Part 2, MPEG-4 Part 2, H.264 (MPEG-4 Part 10), HEVC, etc. This may be computationally intensive, particularly for large spatial resolutions or if a number of background videos are processed simultaneously.

Figure 2:
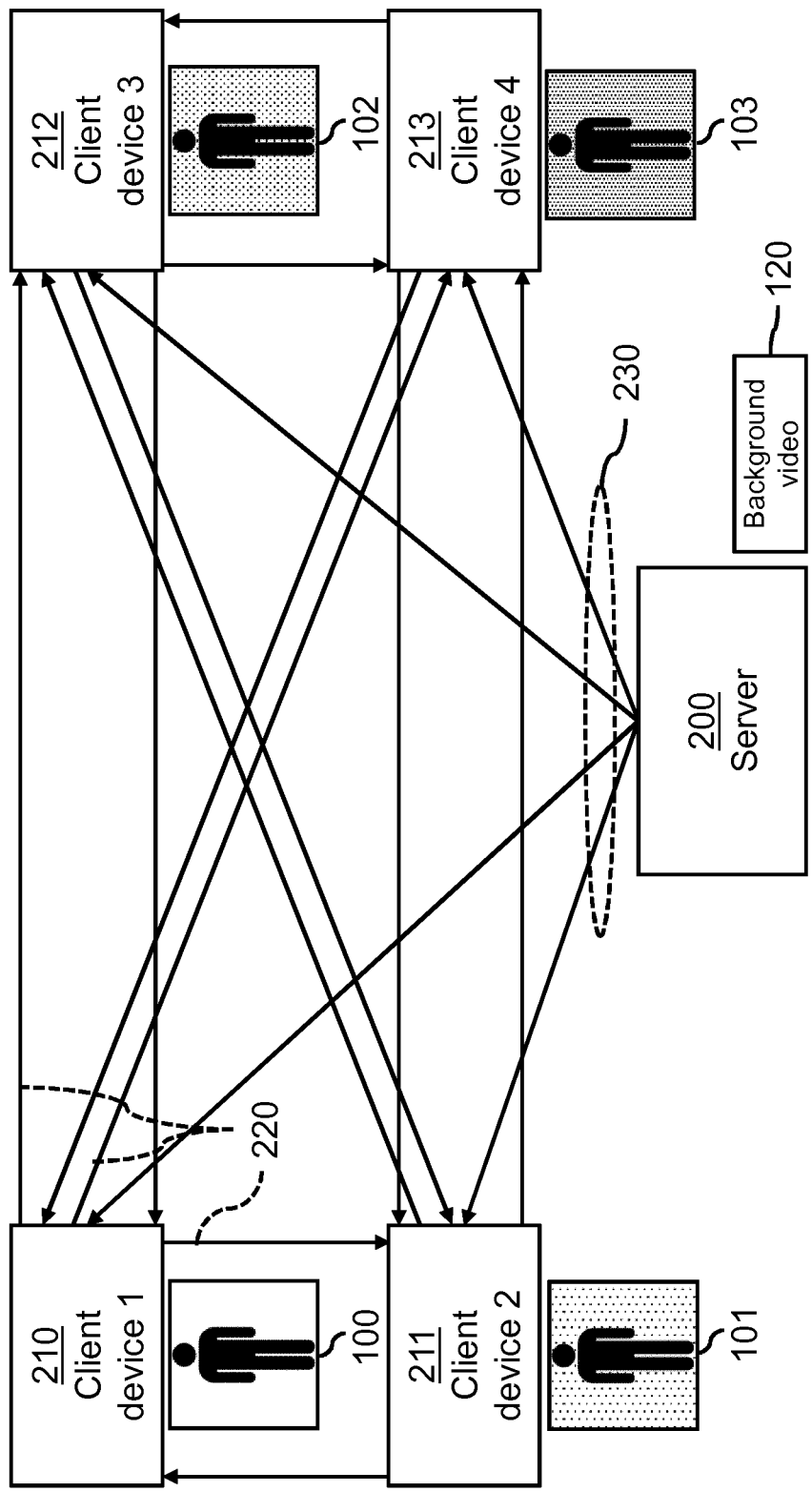
FIG. 2 shows multi-user video conferencing in which video streams of respective users are shown in front of a background video, while illustrating the streams between the server and the client devices and between the client devices.

FIG. 2 shows multi-user video conferencing in which video streams of respective users are shown in front of a background video. The prior art way of combining a foreground video stream with a background video may be particularly disadvantageous in such a scenario. Namely, a server 200 may stream 230 a background video 120 to each of the client devices 210-213 participating in the multi-user video conferencing. At the same time, each of the client devices 210-213 may obtain a real-time recording 100-103 of a respective user of the client device and stream the resulting video stream to each of the other client devices, which is illustrated in FIG. 2 for the streams 220 transmitted by the 'first' client device 210. Each of the client devices 210-213 may then locally combine the received video streams, e.g., by decoding the background video stream, decoding each of the video streams received from the other client devices, and then inserting the latter in the former.

In the example of FIG. 2 with four client devices 210-213, each client device may have to transit the real-time recording of a respective user to three other client devices while receiving three video streams of each of the other client devices and a background video stream from the server 220. In total, there may be 12 video streams transmitted by respective client devices 210-213 and four video streams transmitted by the server 220, which may represent a burden on the network connecting the client devices with each other and/or with the server and may also create more points of failure as each of these streams may be time sensitive. Each client device may have to decode four video streams simultaneously, which may be computationally intensive.

The situation of FIG. 2 may be aggravated in case the multi-user video conferencing takes place in VR. This may represent a so-called 'Social VR' use case in which users may communicate with each other by simulating that they are in the same place. Essentially, Social VR may involve each client device 210-213 recording a respective user to obtain a real-time video 100-103 of the user, and optionally separating the image data of the user from the image data of the user's surroundings in the real-time video of the user (also referred to as 'background removal'). The image data of the user may then be streamed as a real-time video stream 220 to other client devices which may in turn overlay any received 'foreground' video streams onto an omnidirectional video, such as a 180-degree or 360-degree video, which is received as a background video stream 230 from a server 200. This way, each of the users may see the other user's video within a shared space provided by the background video, which may give the users a feeling of being in a same space. This may help to create a sense of immersion in 'digital' multi-user communication between users.

In such Social VR situations, the omnidirectional video provided as background video may be particularly high-resolution, e.g., 4K or 8K. Decoding a high-resolution background video stream and several foreground video streams at the same time may be particularly computationally intensive for a client device.

Figure 3:
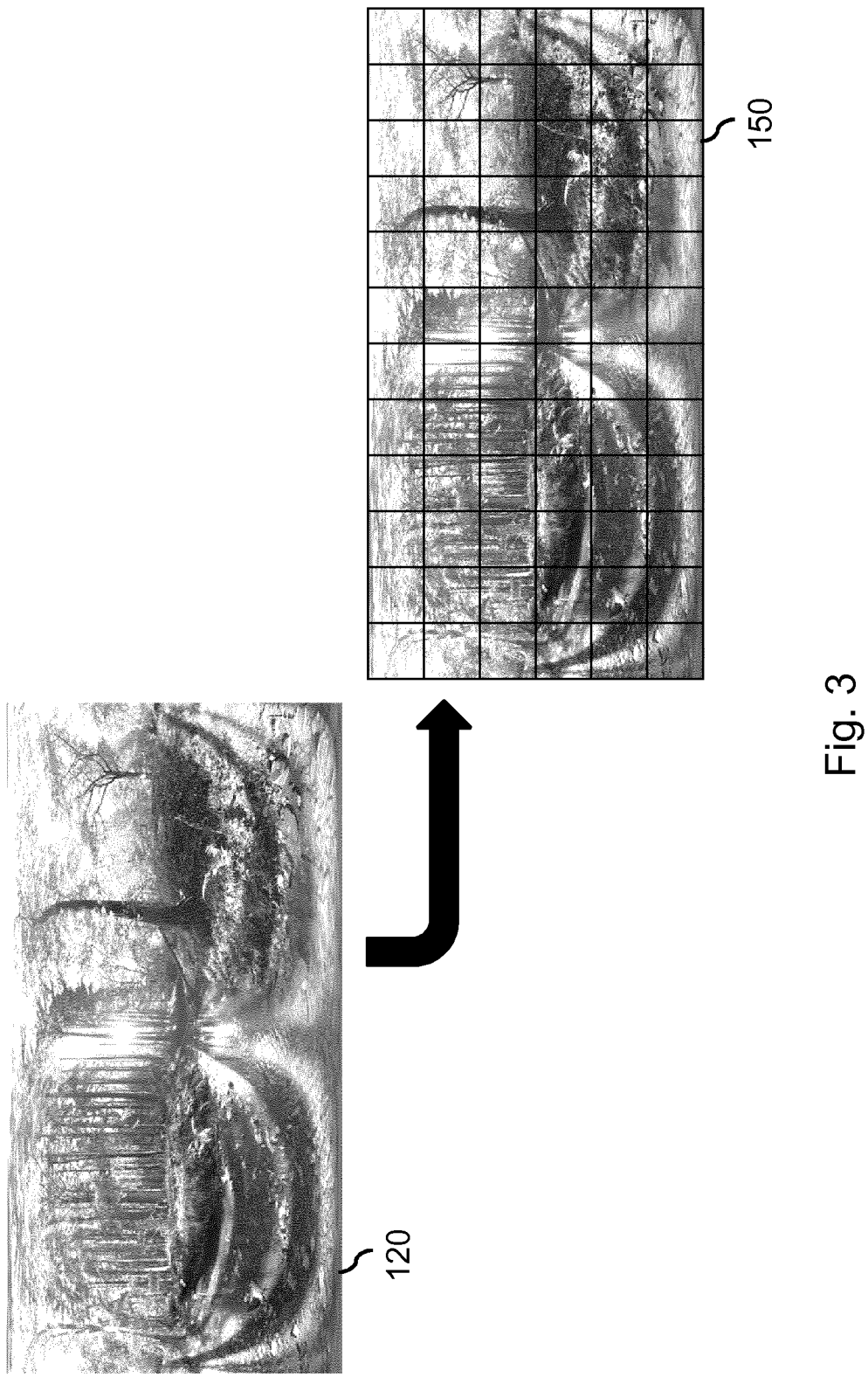
FIG. 3 shows a background video encoded in a spatially segmented manner, resulting in a spatially segmented encoding of the background video.

FIG. 3 and following illustrate how the embodiments of the present invention address such problems using segmented encoding techniques. Namely, a background video 120 may be encoded in a spatially segmented manner, resulting in a spatially segmented encoding 150 of the background video. For example, as spatial segments, so-called 'tiles' [3], [4] may be used which may subdivide a video frame into logically separate rectangular parts that may be decoded independently when decoding a given frame. For example, HEVC tiles [4] and similar spatial segmentations do not allow spatial prediction across tile boundaries in a frame or entropy coding dependencies. As such, the tiles are independent with respect to the encoding and decoding process; prediction and filtering do not cross tile boundaries. The HEVC standard defines the tile configuration for the entire frame as a homogenous regular grid, as depicted by FIG. 3.

Figure 4:
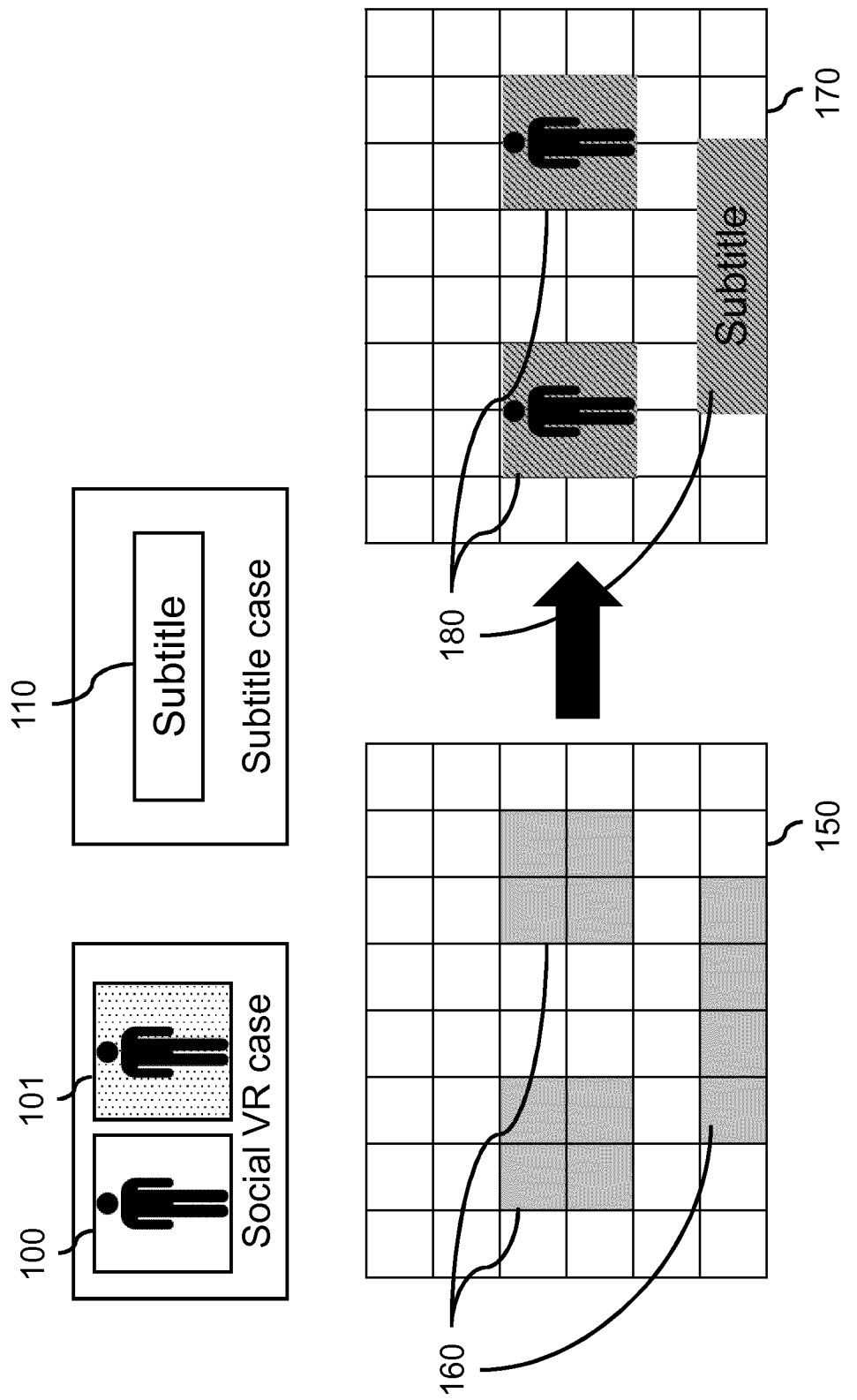
FIG. 4 shows select segments of the background video being decoded, image data of foreground video(s) being inserted into said segments, and the segments being re-encoded to obtain a spatially segmented composite video stream.

FIG. 4 shows how such tiles, or in general any other type of spatial segments which are independently encodable and/or decodable, may avoid the need to decode an entire background video frame if image data of a foreground video stream is to be inserted. Namely, if foreground video streams 100, 101 of users and/or a foreground video stream 110 comprising subtitles are to be inserted into a background video which is available in a segmented form 150, only select segments 160 may need to be decoded, namely only those in which the image data of the foreground video stream is to be inserted. The image data of the foreground video streams may then be inserted into the decoded background image data of the segments 160. This may for example involve only inserting a part of the image data of the foreground video streams 100-110, e.g., the image data representing a user or a subtitle and not its surroundings. As a result, composite segments 180 may be obtained which may be encoded and which, together with the remaining 'non-processed' segments of the background video 150, may provide a spatially segmented encoding of a composite video 170.

In this respect, it is noted that if the image data of a background segment is entirely occluded by the image data of a foreground video stream, for example both in terms of spatial extent but also by the background image data being entirely replaced by the foreground image data, it may not be needed for the background segment to be decoded at all. Rather, the background segment may be simply replaced by a newly generated segment containing the image data of the foreground video stream. Such decoding may in general only be needed if the composite video segment still contains image data of the background, for example spatially surrounding the image data of a foreground video stream, or being intermixed therewith, e.g., by the image data of the foreground video stream being inserted using translucency or other types of blending.

It is noted that the generating of the composite video 170 may involve rewriting the bitstream of the background video 150, e.g., in a manner as described in [5] and [6]. Such rewriting may comprise changing parameters in the bitstream, e.g. high-level syntax parameters, such as tile locations and dimensions in the Picture Parameter Set (PPS). However, as the entire video maintains the same spatial size (resolution), relatively fewer parameters are subject to change compared to the aforementioned examples in [5] and [6].

It will be appreciated that the composite segments 180 may be encoded at a higher bitrate than the bitrate at which the subset of background segments were encoded, or in general, at a higher quality level. For example, the used encoder may choose suitable values of quantization parameters (QP) for the composite segments 180 to improve the quality. For example, in HEVC, QP values may range from 0-51 with the highest quality being 0. The encoder may regulate the QP to lower values and increase quality in the composite segments 180. Such increase of quality may also be specific to composite segments which contain image data of users (persons) as this is typically watched with more attention.

The technique described with FIGS. 3 and 4 may be advantageously used to generate a composite video stream in a computationally efficient manner, and in particular may allow the insertion of the foreground video to be 'offloaded' from the client device onto a server or similar entity. As a result, the client device may now receive a single composite video stream, which may be easier to decode by the client device than the separate background video streams and foreground video stream(s).

Figure 5:
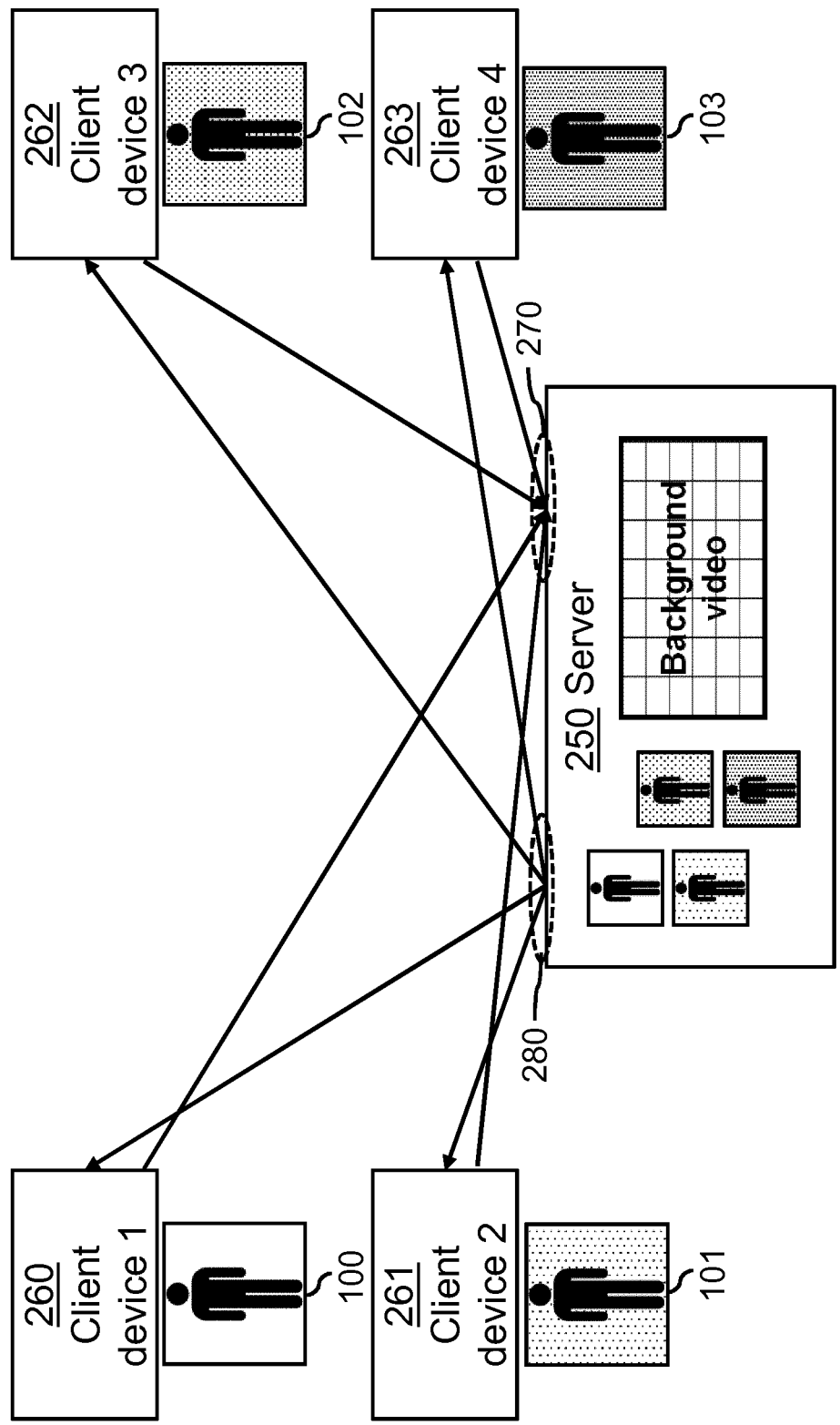
FIG. 5 shows multi-user video conferencing in which the server receives the foreground video of each client device and generates a spatially segmented composite video stream for all, or one separately for each, of the client devices.

FIG. 5 shows the use of the technique described with FIGS. 3 and 4 in the aforementioned situation of multi-user video conferencing. Essentially, a server 250 may locally generate a spatially segmented encoding of a background video or may obtain the background video already in such a form. A respective client device 260-263 may, as in the example of FIG. 2, record a respective user to obtain a real-time video 100-103 of the user, but may stream the video (possibly after background-removal) as a real-time video stream 270 to the server 250 instead of streaming the video to each of the other client devices 260-263. Upon receiving all foreground video streams 270, the server 250 may generate a composite video stream in the manner as described for FIG. 4 and others, and then stream the composite video stream 280 to each of the client devices 260-263. In some embodiments, as also elucidated further onwards, the server 250 may generate and send a different composite video stream to each of the client devices 260-263, e.g., depending on a viewing position of a respective user.

The techniques described with FIGS. 3 and 4 may be particularly advantageous in a Social VR use case. Namely, by obtaining a spatially segmented encoding of the background video, the server 250 may not only generate the composite video stream(s) in a computationally efficient manner but may also process and/or stream only select segments of the composite stream instead of all segments, for example, to provide so-called viewpoint dependent or Field-of-View (FoV)-based streaming.

It is noted that in a Social VR use case, but also in other examples, the background video may contain a map projection of the image data of the background video, for example in case the background video contains an omnidirectional video such as a 180 or 360-degree video. An example of such a map projection is an equirectangular projection. The same map projection may also be applied to the image data of the foreground video stream before or when inserting said image data into the background image data. Alternatively, an inverse map projection may be applied to the background image data, after which the foreground image data may be inserted. The map projection may then be re-applied to the obtained composite image data.

When comparing the FIG. 2 example to the present FIG. 5 example, it can be seen that instead of having 12 video streams transmitted by respective client devices and four video streams transmitted by the server, only four video streams 270 are transmitted by client devices 260-263 in total, while the number of streams 280 transmitted by the server 250 remains the same. However, as the server 250 now transmits a composite stream, each client device 260-263 may only have to decode the composite video stream, which may in many cases be performed by a hardware decoder of the client device and may thereby be computationally efficient.

Figure 6:
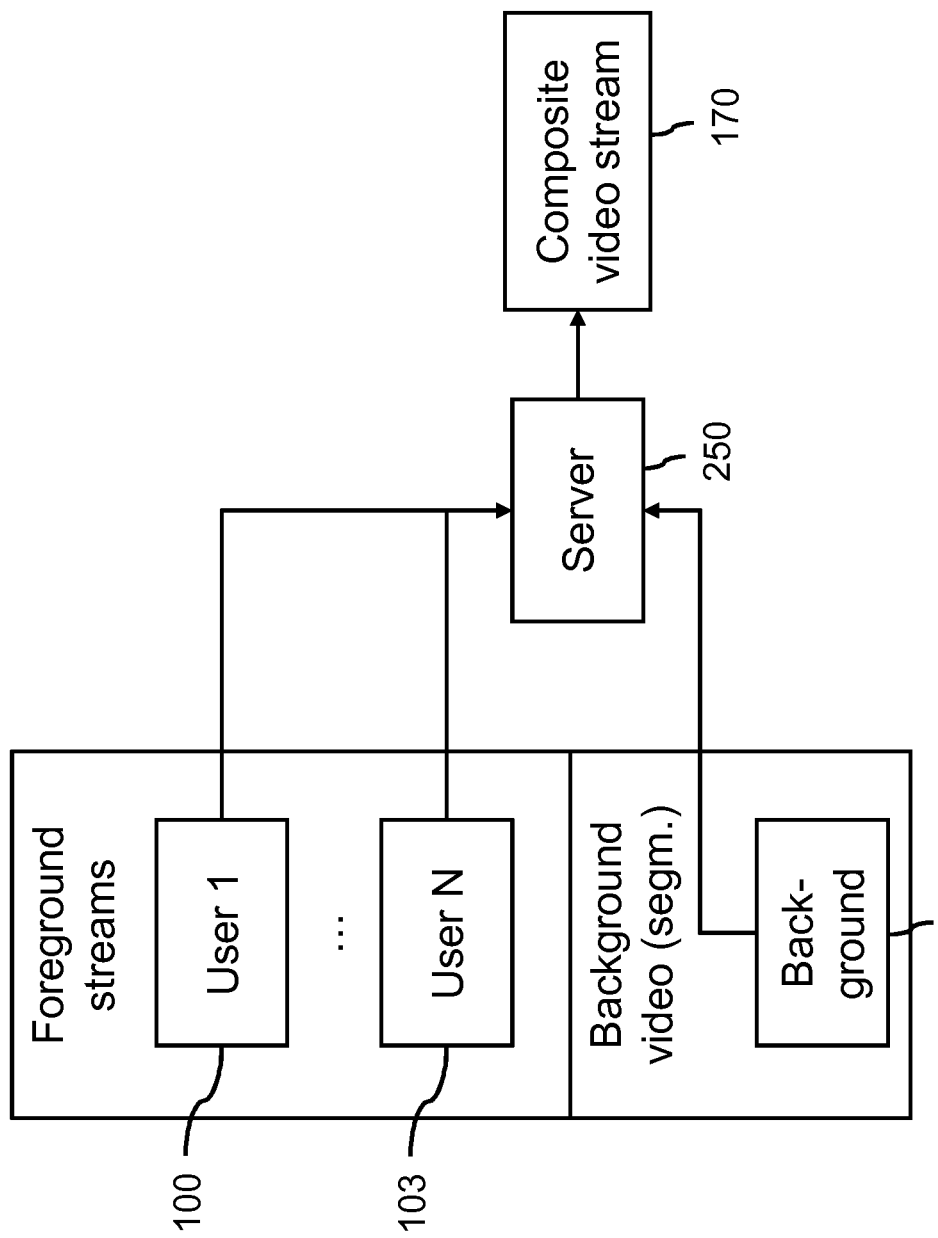
FIG. 6 shows data flows for generating a composite video stream.

FIG. 6 shows data flows for generating a composite video stream: a server 250 may obtain several foreground video streams 100-103, e.g., representing real-time recordings of different users, while accessing a background video 150 which is encoded using a spatially segmented encoding technique. As a result, a composite video stream 170 may be generated by the server which may then be transmitted to one or more client devices. It will be appreciated that the server 250 may receive the foreground video streams 100-103 by streaming from respective client devices, while the background video 150 may be accessed from a local storage. Alternatively, the background video may be accessed from a remote storage and/or streamed as well.

It is noted that in multi-user communication, including the aforementioned Social VR use case, the foreground video streams may be inserted at particular positions relative to the background video. These positions may also be referred to as 'placement positions'. These placement positions may also be dependent on a viewing position of a particular user, as will be elucidated with reference to FIG. 7 and others.

Figure 7:
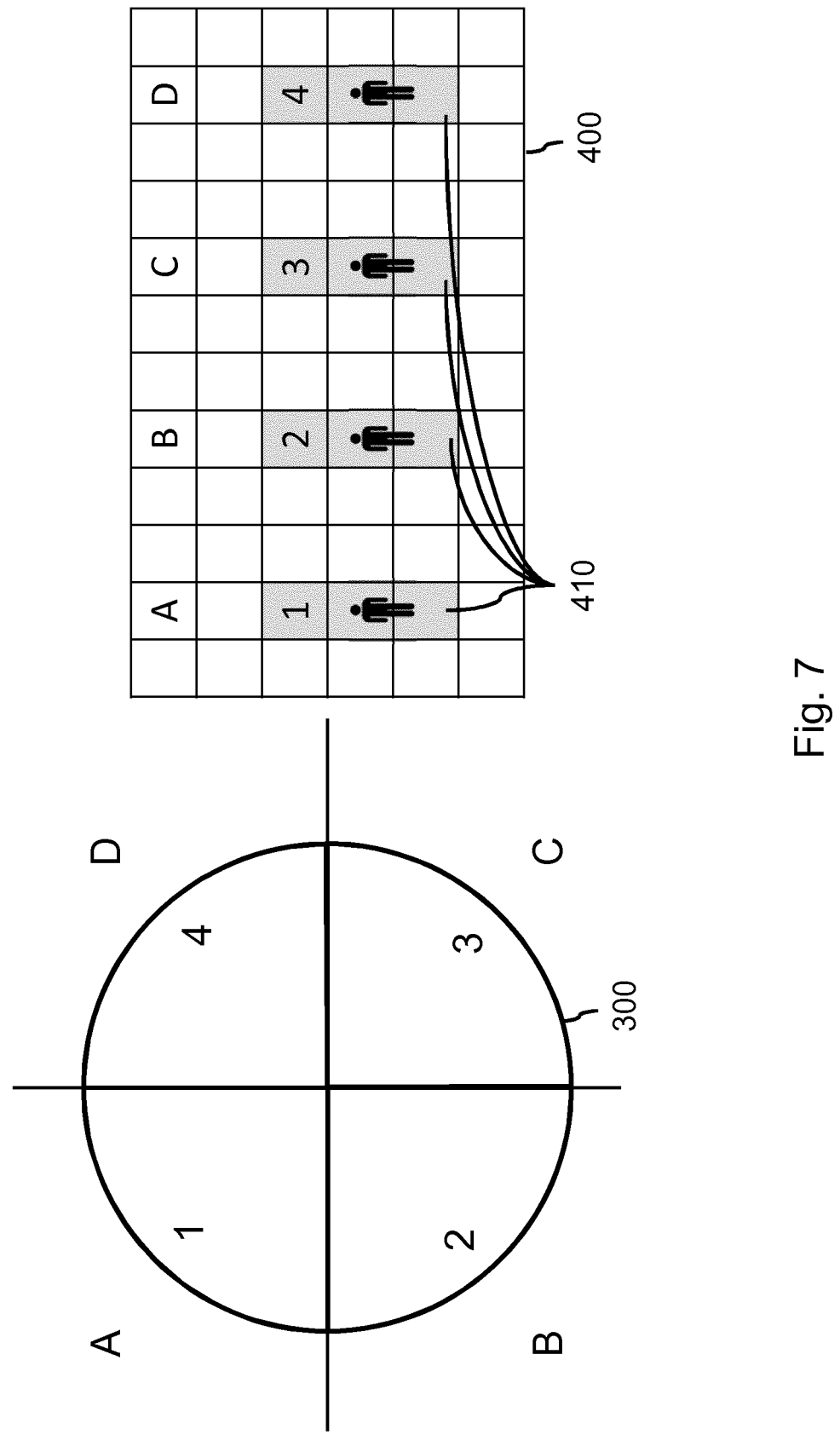
FIG. 7 illustrates an arrangement of users in a multi-user video conferencing setting in a VR environment, while illustrating how a composite video stream may be generated which may be displayed in the VR environment.

FIG. 7 illustrates an arrangement of users in a multi-user video conferencing setting in a VR environment, while illustrating how a composite video stream may be generated which may be displayed in the VR environment. In the example of FIG. 7 and following, the arrangement of the users in the VR environment is one where users are arranged 300 along a 'virtual table' while facing each other, this being the virtual equivalent of people physically sitting at a round table or standing in a circle. However, the following concepts and techniques also apply to other arrangements of the user in the VR environment, mutatis mutandis, which may include but is not limited to non-circular arrangements such as an elongated or rectangular seating/sitting arrangement or a row-like seating including auditorium, class room or cinema-like seating.

In FIG. 7, the available positions for users at the 'virtual table' 300 are indicated with A-D, being in this specific example four positions, while the placement positions of the users of the respective client devices are indicated by reference numerals 1-4, e.g., user 1 at placement position A, user 2 at placement position B, etc. In the VR environment, there may be predetermined placement positions for the foreground video streams of the respective users relative to the background.

For example, the right-hand side of FIG. 7 shows a segmented encoding of the composite video 400 which may represent a 180 or 360-degree video and in which there may be four placement positions of users which are indicated with A-D, corresponding with the available positions A-D at the virtual table 300. The placement positions may be defined in various ways, for example as coordinates relative to the background video, by a pixel-mask, etc. In the example of FIG. 7, these placement positions are located within a select number of spatial segments 410, each being in the specific example of FIG. 7 three vertically adjacent segments marked in grey. As such, to insert the foreground video streams (shown in FIG. 7 and further simply by a symbol/drawing of a person), it may suffice for these segments to be decoded.

A similar composite video as the one shown in FIG. 7 may be generated for a specific client device. For that client device, it may not be needed for the foreground video stream which is transmitted by this client device to be inserted into the background video (as the user does not need to see him/herself in the VR environment), but rather only the foreground video streams of other client devices. As such, a different composite video stream may be generated for each of the client devices. There may be several options for generating such a composite video stream and for determining the placement positions of foreground video streams of the client devices, resulting in different arrangements of the users in the VR environment.

Figure 8A:
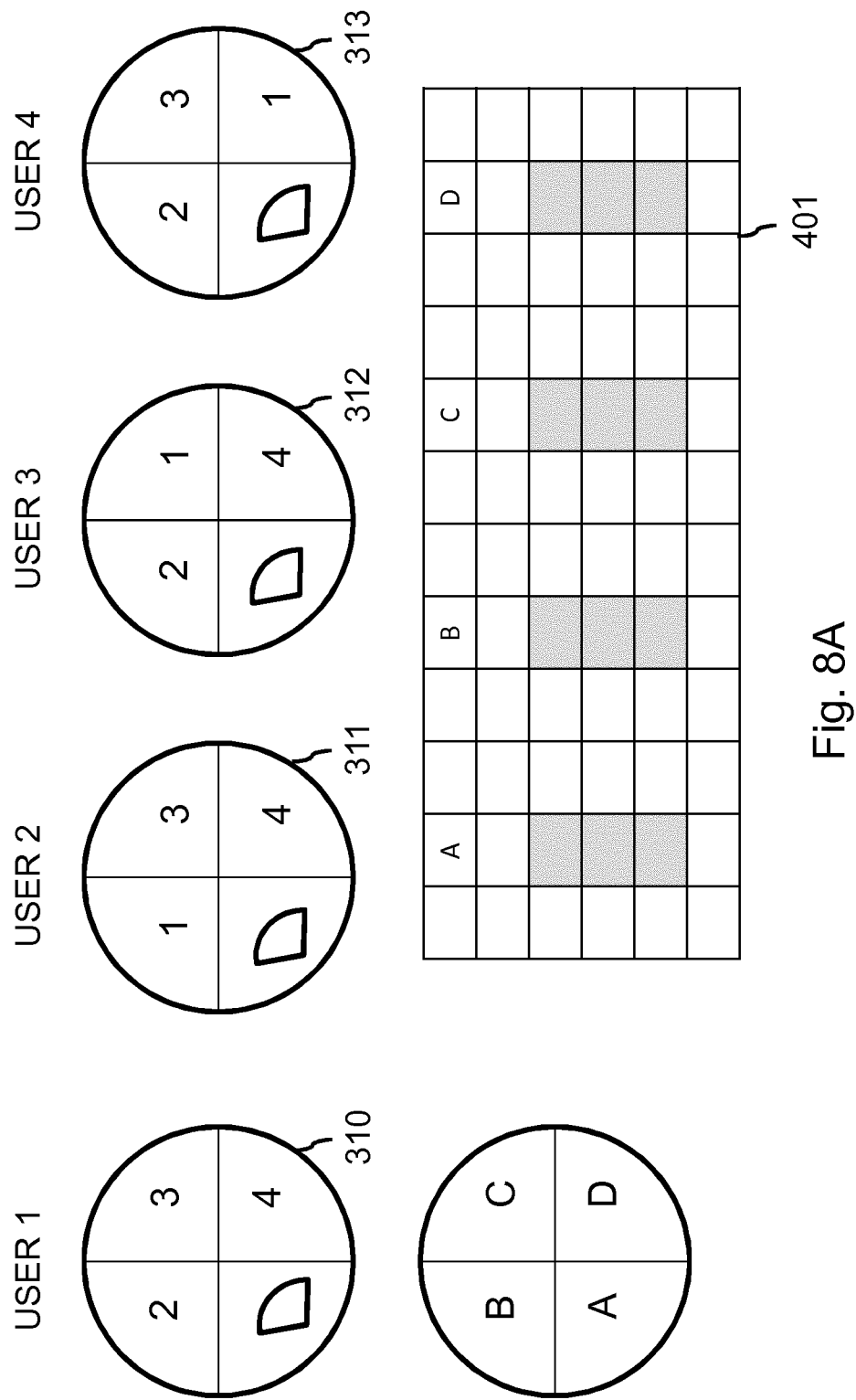
FIG. 8A illustrates an arrangement of the users in which the placement positions of the users in the VR environment are mutually inconsistent.

FIG. 8A illustrates an arrangement of the users which is inconsistent between the users in the multi-user video conferencing setting in the VR environment. Namely, here, different arrangement 310-313 of the users are shown for the client devices of each of the users 1-4. For example, for user 1, the placement positions of users 2, 3 and 4 are B, C and D, as illustrated in the bottom half of FIG. 8A in a 'virtual circle' and in the composite video stream 401. For user 2, users 1, 3 and 4 are placed at B, C and D (see arrangement 311), while for user 3, users 2, 1 and 4 are placed at B, C and D (see arrangement 312) and for user 4, users 2, 3 and 1 are placed at B, C and D (see arrangement 313). These arrangements, however, are inconsistent with each other as it appears to user 1 that he/she is sitting counter-clockwise of user 2, whereas for user 2, it also appears that he/she is sitting counter-clockwise of user 1, which is inconsistent with an actual physical arrangement and may disturb communication. For example, during a conversation between user 1 and 2, user 1 may look to his/her left while user 2 may do the same. This may result in both users being presented with a display of the other user looking away instead of towards them.

In some embodiments, the placement positions of the foreground video streams may be dependent on a viewpoint position of the user of the client device for which the composite video stream is generated. In the present context, the viewing position may refer to a relative position of the user in the arrangement of the user, e.g., representing the position of the user from which the user views the other users. For example, the viewing position may indicate that the particular user, say user 1 is placed in between users 2 and 4 and opposite to user 3. This may enable an arrangement of the users which, unlike the FIG. 8A arrangement, is consistent between the users.

Figure 8B:
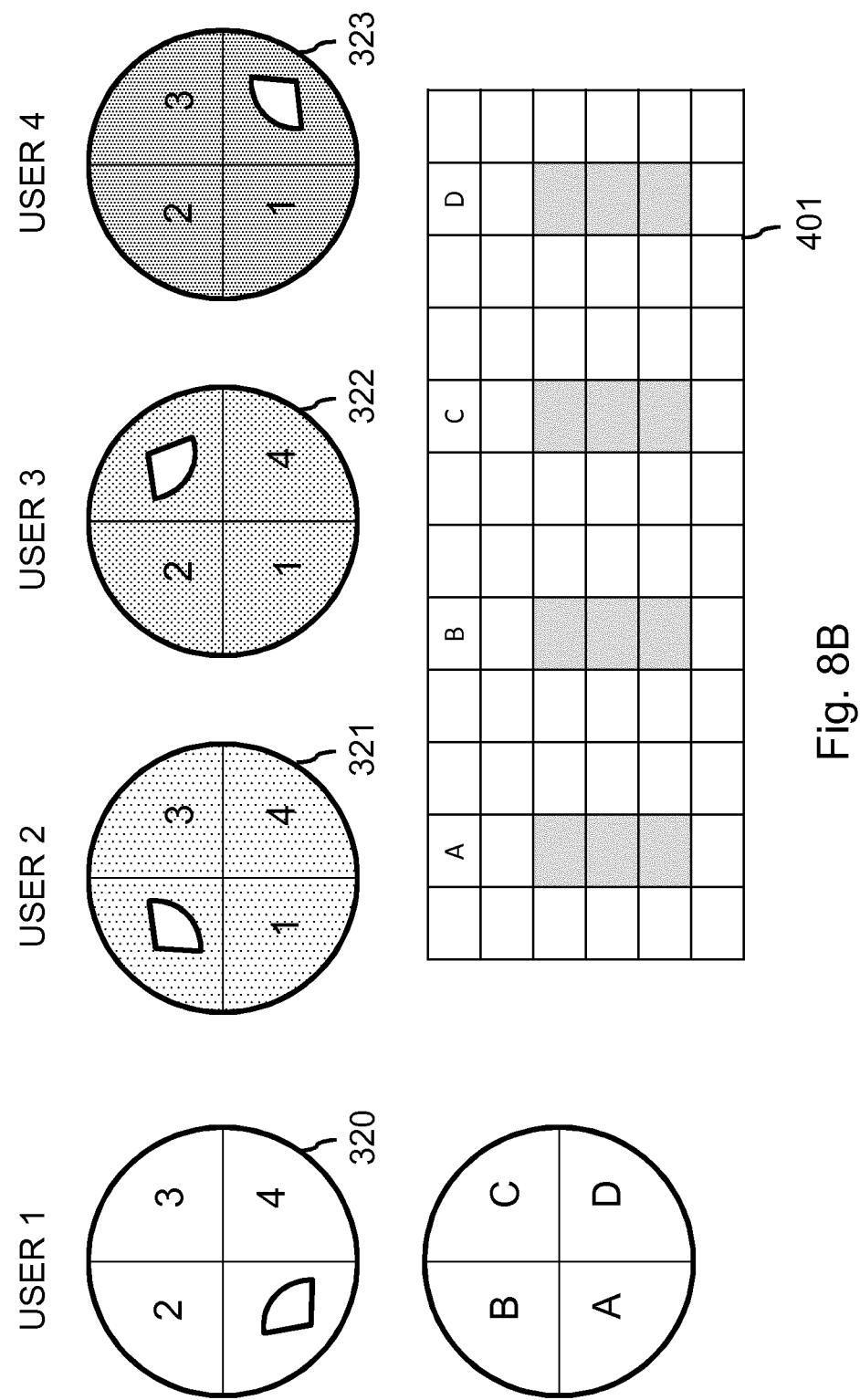
FIG. 8B illustrates an arrangement of the users in which the placement positions of the users in the VR environment are mutually consistent.

FIG. 8B shows an example of such an arrangement of the users. Here, a different arrangement 320-323 of users is shown than in FIG. 8A. For example, for user 1, the placement positions of users 2, 3 and 4 are B, C and D, as illustrated in the bottom half of FIG. 8B in a 'virtual circle' and in the composite video stream 401, this still being identical to FIG. 8A. However, for user 2, users 1, 3 and 4 are placed at A, C and D (see arrangement 321), while for user 3, users 1, 2 and 4 are placed at A, B and D (see arrangement 322) and for user 4, users 1, 2 and 3 are placed at A, B and C (see arrangement 323). These arrangements are consistent with each other as it appears to user 1 that he/she is sitting counter-clockwise of user 2, whereas for user 2, it appears that he/she is sitting clockwise of user 1, which is consistent with an actual physical arrangement. The same applies to the users 3 and 4, mutatis mutandis. Effectively, users may be assigned a fixed placement position relative to the background video, with only the foreground video streams of the 'other' users being inserted when generating a composite video stream for the client device of a respective user.

Figure 9:
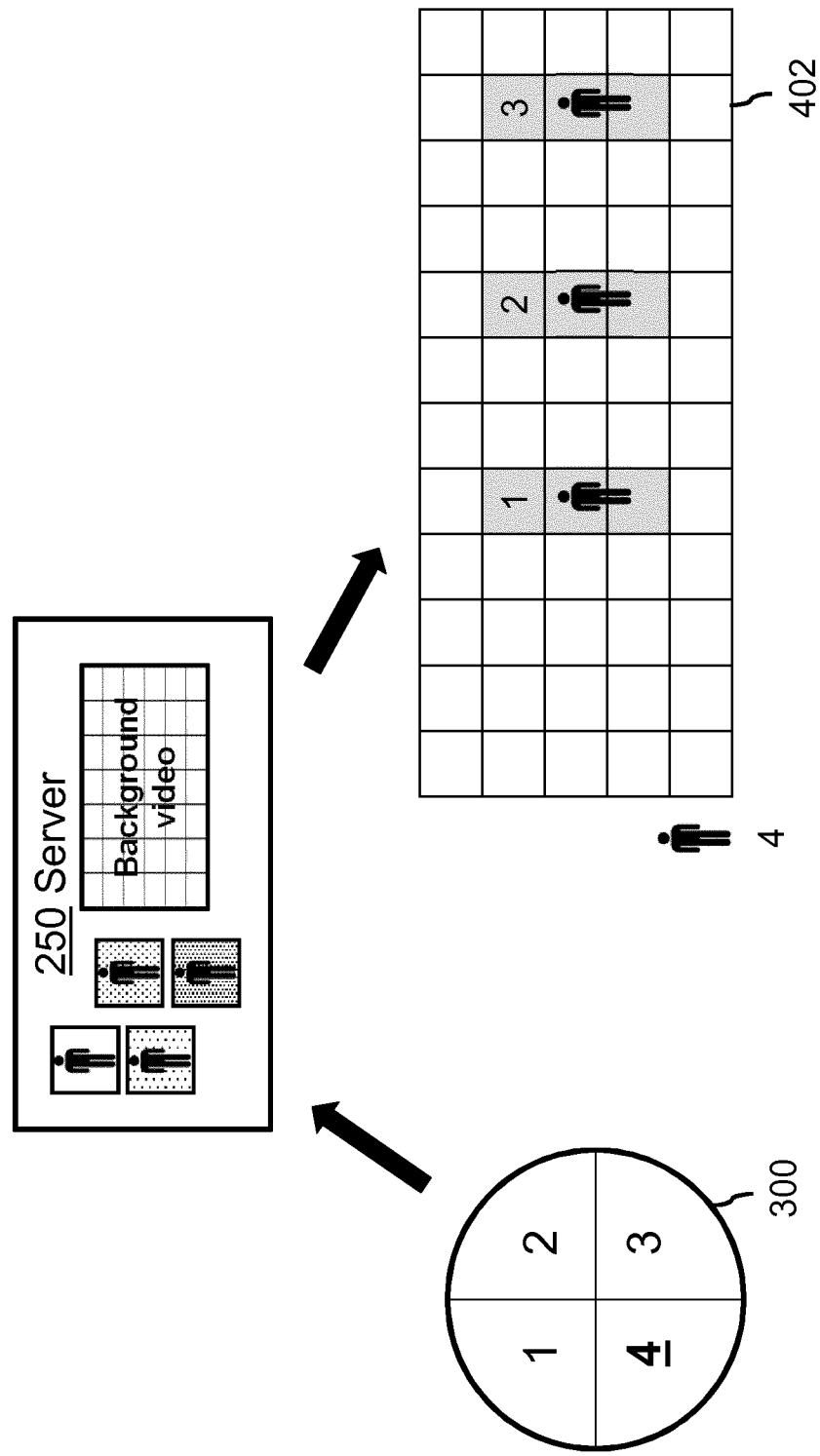
FIG. 9 shows an example in which a composite video stream is generated for a particular user, namely user 4, based on the user's viewing position.

FIG. 9 shows an example in which a composite video stream 402 is generated for a particular user, namely user 4. In this example, the composite video stream 402 is generated based on the user's viewing position, being counterclockwise of user 1, clockwise of user 3, and opposite to user 2, as also shown in the virtual circle 300 by respective numerals. A user's viewing position may be determined based on placement data of the respective users in the VR environment, for example, indicating that the users are placed in a circular arrangement 300 while also indicating the relative order of the users, e.g., 1, 2, 3, 4 clockwise. Based on this data, the server 250 may generate a composite video stream 402 in which the foreground video streams of users 1, 2 and 3 are inserted into the background video. It is noted that the foreground video stream of user 4 is not inserted into the background video, which is schematically indicated in FIG. 9 by user 4 being left out of the composite video stream 402.

With continued reference to FIGS. 8A and 8B, in each of the composite video streams 401, the segments indicated in white in FIGS. 8A and 8B may remain unprocessed, whereas for all composite video streams, the segments marked in grey in placement positions B, C and D may be decoded while inserting different foreground video streams into said segments depending on the respective user's viewing position.

Figure 10B:
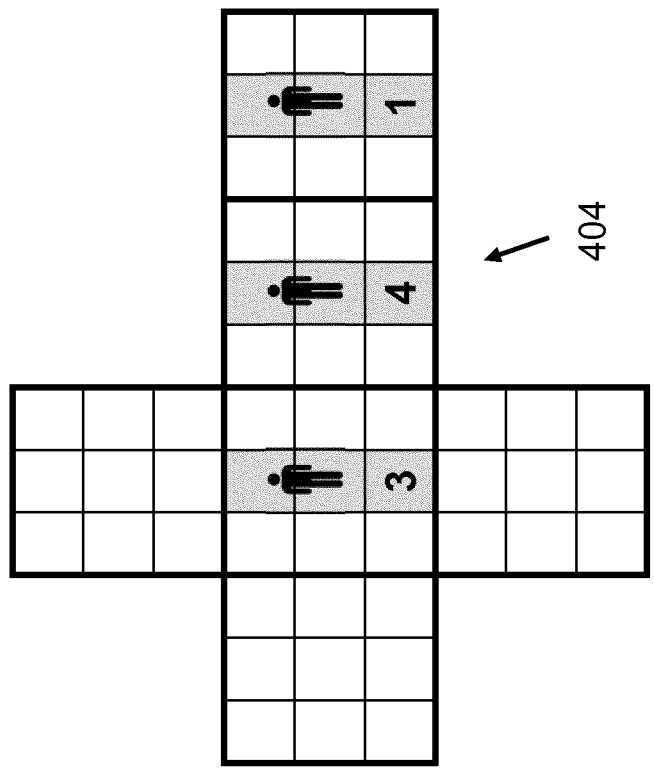
FIG. 10B shows a cube-map based composite video stream for user 2.
Figure 10A:
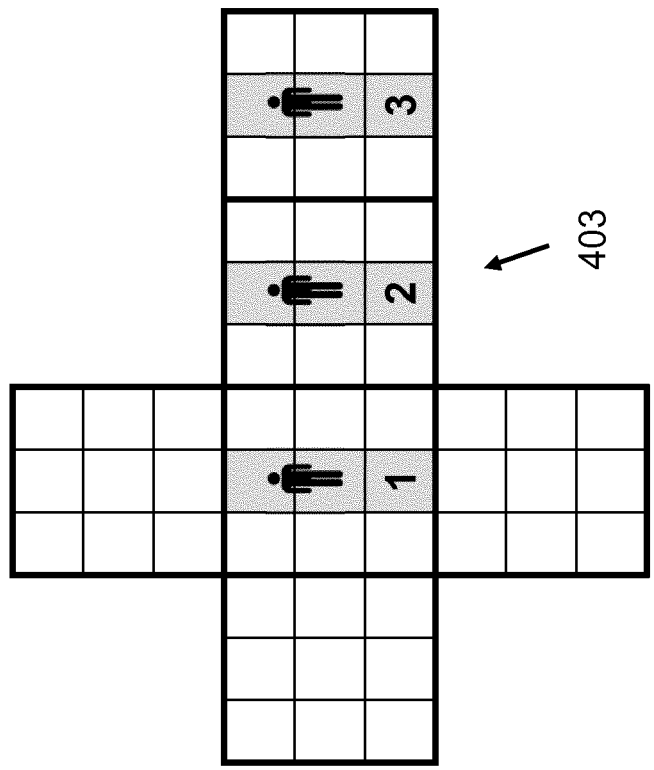
FIG. 10A shows a cube-map based composite video stream for user 4.
Figure 11A:
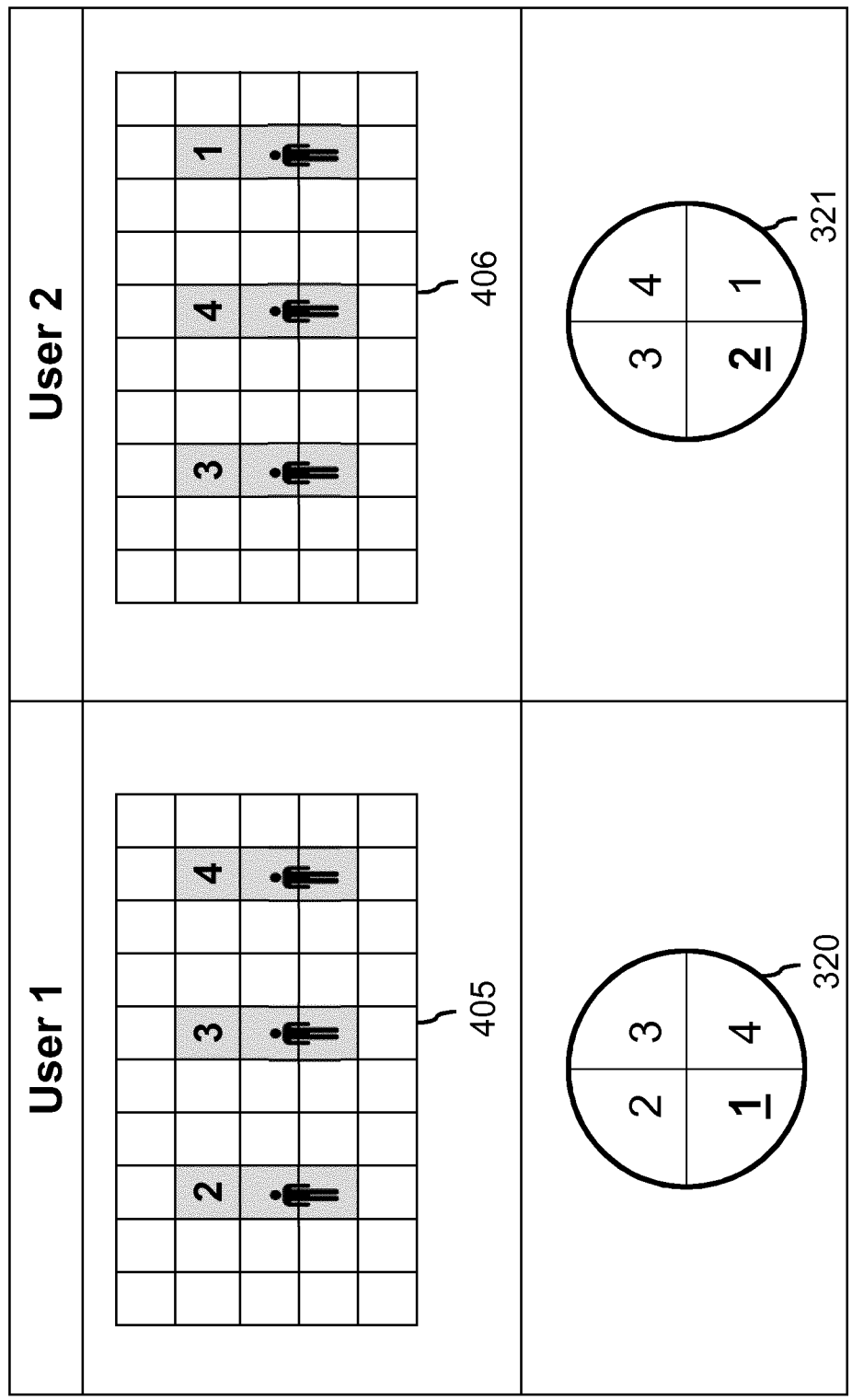
FIGS. 11A and 11B show composite video streams for users 1-4 providing a mutually consistent placement of the users in a VR environment.
Figure 11B:
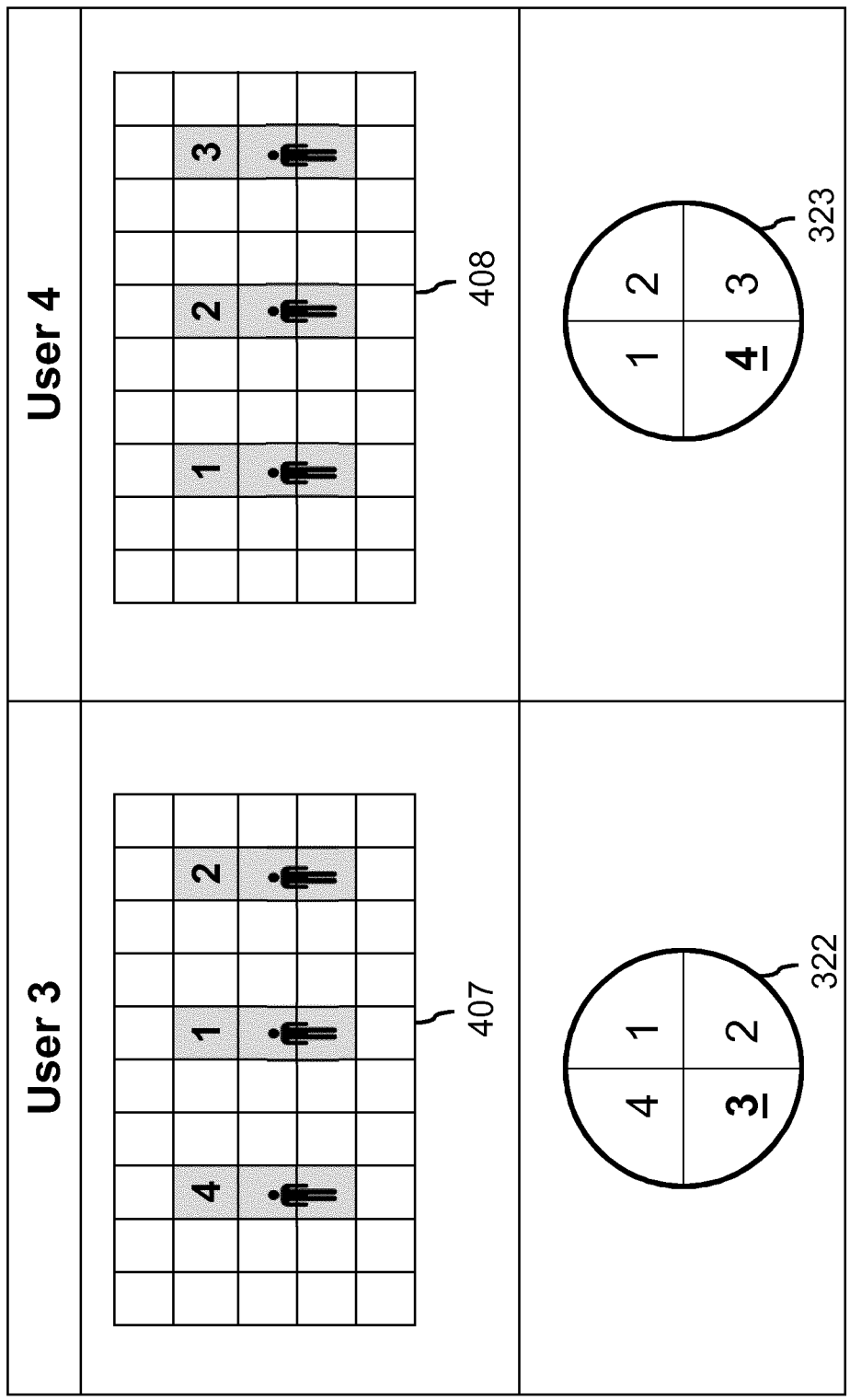

FIGS. 10A and 10B show an example of such different composite video streams 403, 404 for different users, being in the example of FIG. 10A a composite video stream 403 for user 4 and in the example of FIG. 10B a composite video stream for user 2. Both Figs. additionally illustrate such a composite video stream comprising a cube-map projection of the background video. The server may have to take this cube-map projection into account to place the foreground video streams at their appropriate position in the background video, either explicitly, e.g., by obtaining map data defining the cube-map projection, or implicitly, e.g., by obtaining the placement positions already in such a way that no additional knowledge of the projection is needed.

Similar to FIGS. 9-10B, FIGS. 11A and 11B show different composite video streams 405-408 for users 1-4 which are generated based on a viewing position of a respective user in the arrangement of users, as indicated by virtual circles 320-323. Here, the current user is indicated by the corresponding reference numeral being underlined. It can be seen that the user arrangements are consistent with each other.

It will be appreciated that in alternate embodiments, the viewing position may be characterized as a 2D or 3D position in the VR environment. If the foreground video stream is not to be 'glued' onto the background video but rather to be represented in the VR environment as a separate object which is to be placed in front of the object representing the background video (e.g., the surrounding sphere), the viewing position may determine which parts of the background video are occluded by the foreground video stream, and thereby also which spatial segments of the background video are to be processed (by decoding, compositing and re-encoding). By taking the viewing position of the user of the client device into account, the composite video stream may show the foreground video stream composited onto the background video in a way which at least coarsely matches the viewing position of the user in the VR environment. Such and similar embodiments are well within reach of the person skilled in VR-based multi-user communication based on the present specification.

Figure 12:
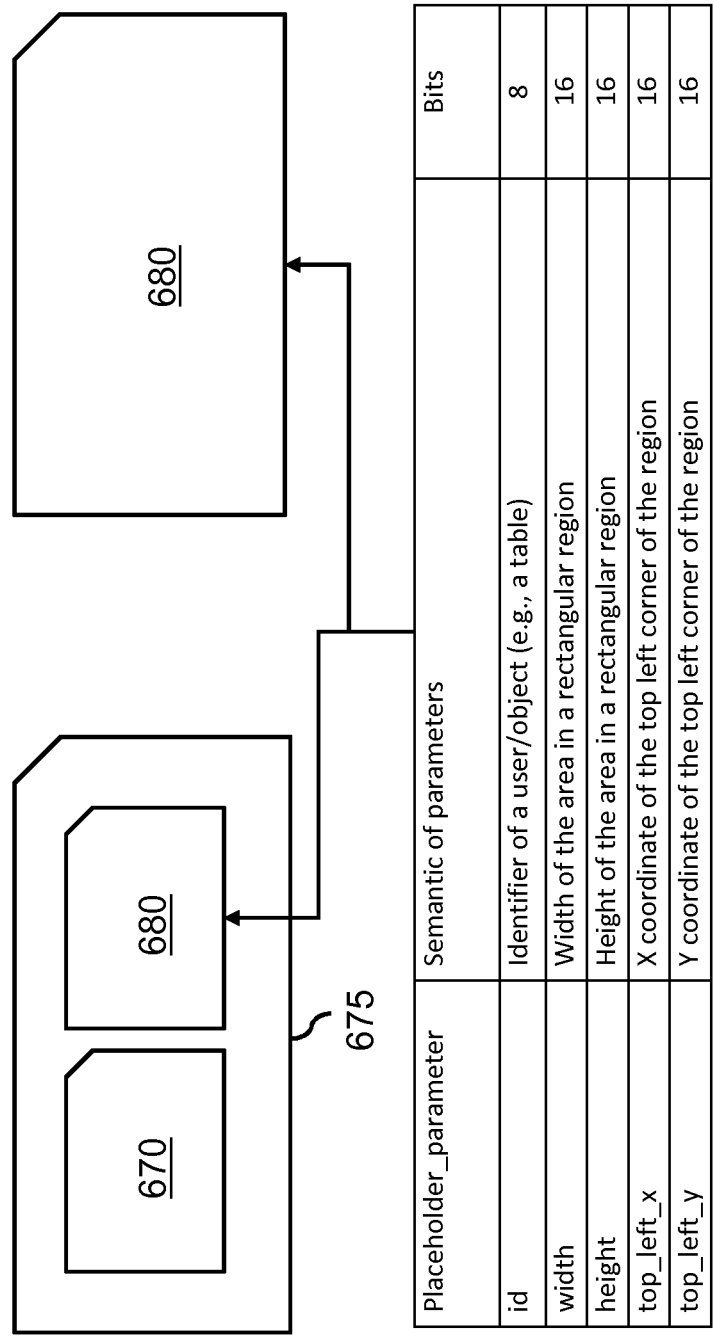
FIG. 12 shows placement metadata defining the placement positions for one or more foreground video streams relative to the background video.

In general, the placement positions of the foreground video streams may be defined by metadata, which is also referred to as placement metadata. This metadata 680 is shown schematically in FIG. 12 and may be associated with the background video. For example, as also illustrated in FIG. 12, the placement metadata may define the placement positions in a coordinate system associated with the background video, e.g., in terms of pixel coordinates. However, various other definitions are equally conceivable. In general, the placement metadata 680 may be part of a same data container 675 as the background video 670, for example a same file or media stream, but may also be provided as separate metadata 680 which can be associated with the background video 670. For example, the metadata 680 may contain an identifier of the data container of the background video 670, such as an URL, thereby allowing the metadata to be retrieved and associated with the background video. Yet another example is that the metadata may be included in a manifest file which is associated with the background video 670, or that it may be included in a service announcement, e.g., in an EPG. Various other means of association are equally conceivable. For example, in some embodiments, the background video 670 may link to the placement metadata 680, e.g., by containing an URL at which the metadata 680 is accessible.

Figure 13:
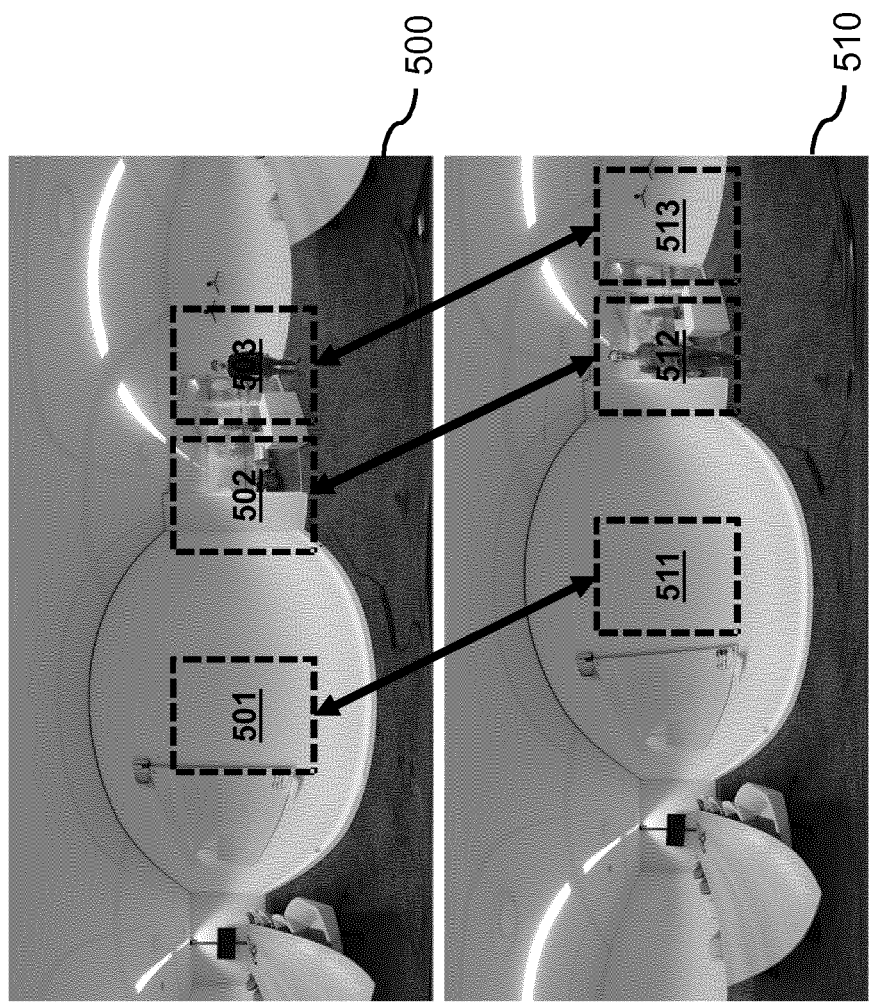
FIG. 13 show placement positions of foreground video streams relative to the background video for two different capture positions of the background video.

FIG. 13 illustrates that such placement metadata may allow placement positions 501-503, 511-513 to be defined for two different captures 500, 510 of a same scene which nevertheless correspond in terms of relative position with respect to a content of the background video, as indicated in FIG. 13 by the arrows between placement positions 501-503 in capture A 500 and placement positions 511-513 in capture B 510. Such different captures of a scene may be used to, for example, provide users with a perspective of the scene which better matches their viewing/placement position in the VR environment. For example, when the VR environment 'virtually seats' users in different seats in a cinema, each of the users may be provided with a different background video captured from their respective position.

In general, in multi-user communication, a foreground video stream may be obtained by a 2D camera and a depth camera or by a 3D camera. As is known per se, such cameras provide depth information which may facilitate background removal.

Instead of a server or distributed system of servers, also one of the client devices or yet another entity may perform the functions described with reference to the server. Effectively, such a client device or other entity may 'act' as server.

Although foreground video streams have been described in the context of multi-user communication as containing real-time recordings of people, they may also contain various other contents, such as an object, such as a table, or an additional video feed which is to be shown to the users in the multi-user communication session.

The server may perform video post-processing before or when generating the composite video stream. For example, the foreground video streams may be tilted, stretched or rotated to better fit the background video. The foreground video streams may also be enhanced, e.g., to improve the appearance of users in said videos.

Each client device (and thereby each user) may be provided with a different background video, e.g., corresponding to a different capture position in a scene. Such different background videos may be captured at such different capture positions, or may be synthetically generated from one background video, e.g., using warping techniques as known per se. Such warping may be performed by the server, e.g., in real-time or before start of the multi-user communication session, or by another entity.

Figure 14:
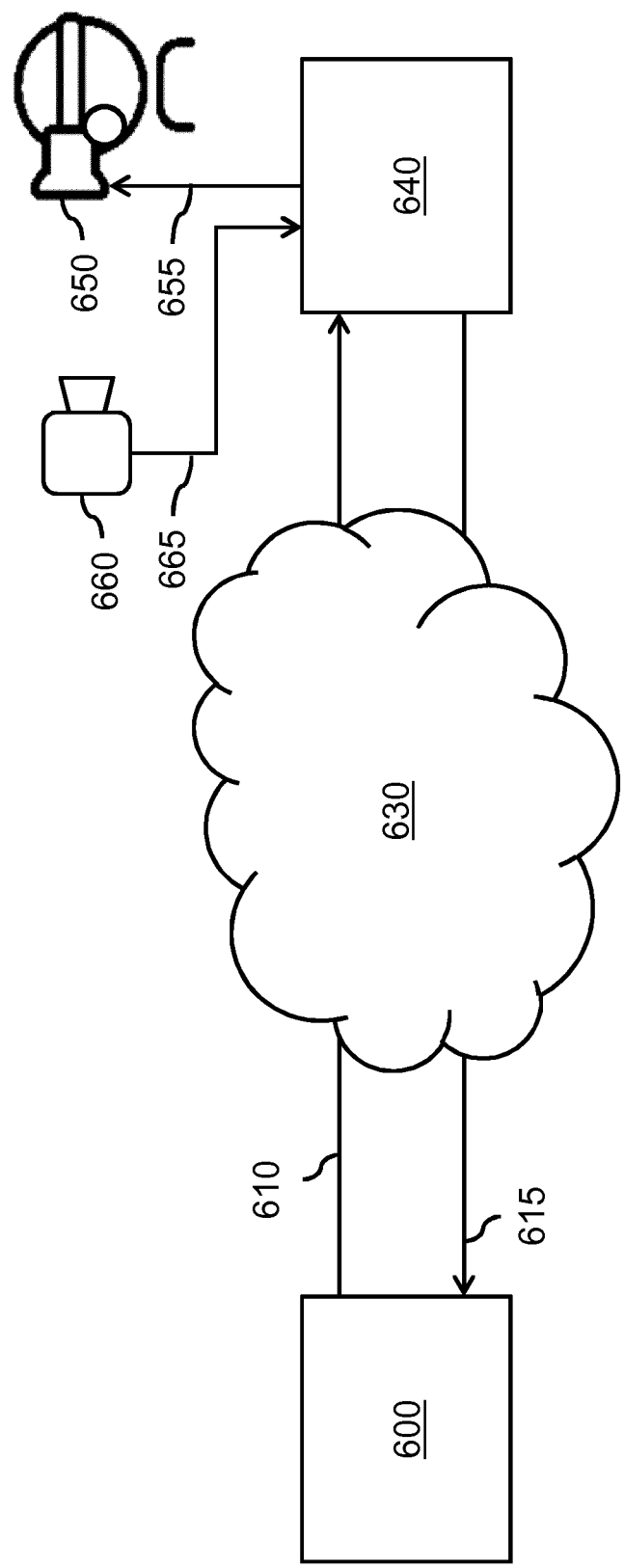
FIG. 14 illustrates data communication between a server and a processor system configured for displaying the composite video stream in a VR environment.

FIG. 14 illustrates data communication between a server 600 and a processor system 640 configured for displaying the composite video stream in a VR environment. The processor system 640 may correspond to one of the client devices of FIGS. 4-13, but specifically configured for VR. The server 600 may correspond to the server 250 as previously described. The server 600, which may be a cloud-based server, may receive a foreground video stream 615 from the processor system 640, e.g., via a network 630 such as the Internet. The foreground video stream 615 contain a real-time recording of a user of the processor system 640, which may be obtained as camera data 665 from a camera 660 directed at the user. The server 600 may stream a composite video stream 610 containing the foreground video streams of other client devices back to the processor system 640. Upon receiving the composite video stream 610, the processor system 640 may establish a visual rendering of a VR environment in which the composite video stream displayed. The processor system 640 may then output rendered image data 655 to an HMD 650 worn by the user.

Figure 15:
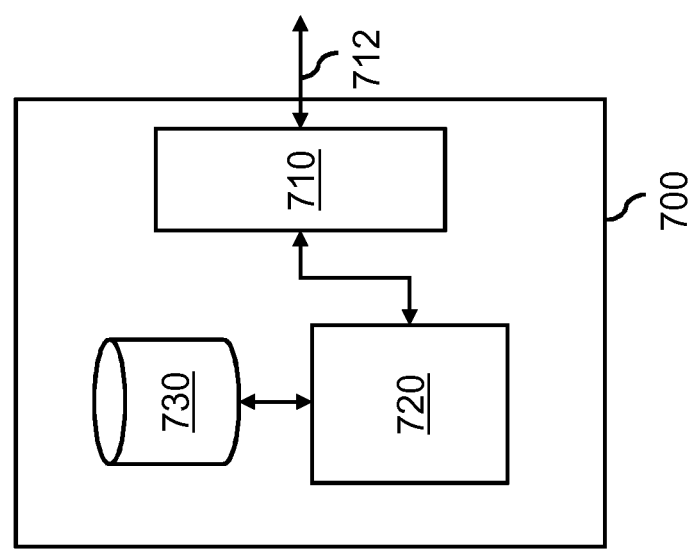
FIG. 15 shows a processor system configured for generating a spatially segmented composite video stream.

FIG. 15 shows a processor system 700 for generating a composite video stream for being displayed by a client device. For that purpose, the processor system 700 is shown to comprise a processor 720 which may be configured, e.g., by hardware design or software, to perform operations described with reference to FIG. 3-14 and elsewhere pertaining to the generating of a composite video stream. For example, the processor 720 may be embodied by a single Central Processing Unit (CPU), but also by a combination or system of such CPUs and/or other types of processing units. The processor system 700 is further shown to comprise a data storage 730, such as internal memory, a hard disk, a solid-state drive, or an array thereof, which may be used to store or buffer data such as the background video, and/or to buffer any received foreground video streams. FIG. 15 further shows the processor system 700 to comprise a network interface 710, which may be any suitable type of network interface via which the composite video stream(s) may be transmitted to client device(s) and via which foreground video stream(s) may be received from client device(s), both types of data being indicated by reference numeral 712. For example, the network interface 710 may be a wireless network interface, e.g., based on Wi-Fi, Bluetooth, ZigBee, 4G or 5G mobile communication, or a wired network interface, e.g., based on Ethernet or optical fiber. For example, the network interface 710 may be a local area network (LAN) network interface or an interface to wide area network (WAN) such as the Internet.

The processor system 700 may be embodied by a (single) device or apparatus. For example, the processor system 700 may be embodied by a server, workstation, personal computer, etc. In some embodiments, the processor system 700 may be an end-user device, for example (integrated into) a same type of device as described with reference to FIG. 16 which is configured for rendering a VR environment. Examples of such devices include, but are not limited to a smartphone, personal computer, laptop, tablet device, gaming console, set-top box, television, monitor, projector, smart watch, smart glasses, media player, media recorder, head mounted display device, etc. The processor system 700 may also be embodied by a distributed system of such devices or apparatuses. An example of the latter may be the functionality of the processor system 700 being at least in part distributed over network elements in a network.

Figure 16:
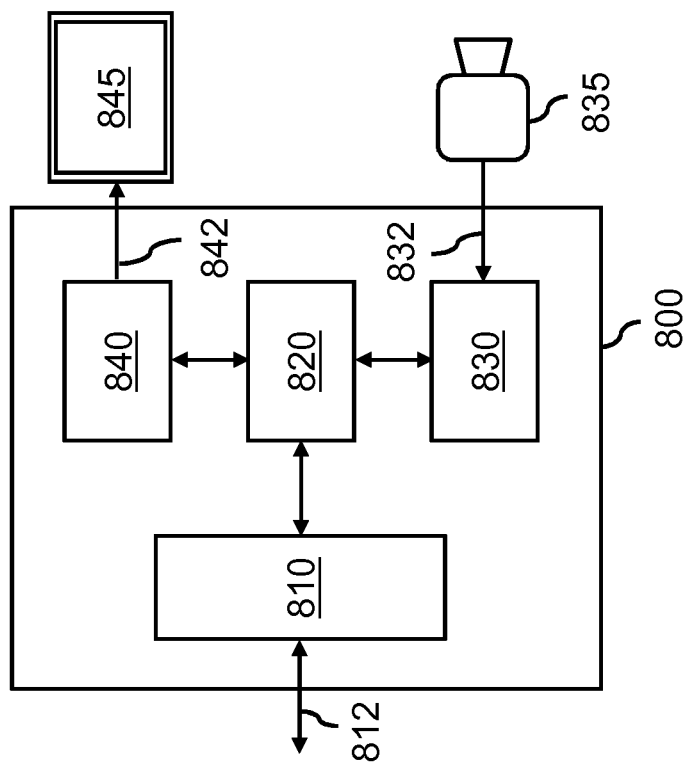
FIG. 16 shows a processor system configured for displaying the composite video stream in a VR environment.

FIG. 16 shows a processor system 800 configured for rendering a VR environment in which a composite video stream is displayed. The processor system 800 may implement part or all of the 'render' and/or 'display' functionality as described with reference to FIGS. 3-15 and elsewhere. The processor system 800 is shown to comprise a network interface 810 which may be configured to receive a composite video stream and/or to transmit a video stream representing a real-time recording of a user, both types of data being indicated by reference numeral 812. The network interface 810 may be any suitable type of interface for receiving and/or transmitting said data, including but not limited to a type of network interface as described with reference to FIG. 15. The processor system 800 may further comprise a camera input 830 by which the processor system 800 may obtain the real-time recording of the user, e.g., by receiving camera data 832 from a connected camera 835. The processor system 800 may further comprise a processor 820 which may be configured, e.g., by hardware design or software, to perform operations described with reference to FIG. 3-15 and elsewhere pertaining to the rendering the VR environment. In some embodiments, the processor 820 may directly generate and output display data 842 to a display 845 such as an HMD. In other embodiments, the processor 820 may output rendered video data which may be output to the display 845 by a display output 840.

The processor 820 may be embodied by a single Central Processing Unit (CPU), but also by a combination or system of such CPUs and/or other types of processing units. Although not shown in FIG. 16, the processor system 800 may also comprise a data storage, such as internal memory, a hard disk, a solid-state drive, or an array thereof, which may be used to buffer data, e.g., the received composite video stream and/or the foreground video stream which is to be transmitted. The processor system 800 may be embodied by a (single) device or apparatus. For example, the processor system 800 may be embodied as smartphone, personal computer, laptop, tablet device, gaming console, set-top box, television, monitor, projector, smart watch, smart glasses, media player, media recorder, head mounted display device, etc. The processor system 800 may also be embodied by a distributed system of such devices or apparatuses. An example of the latter may be the functionality of the processor system 800 being distributed at least in part over network elements in a network.

In general, the processor system 700 of FIG. 15 and the processor system 800 of FIG. 16 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

Figure 17:
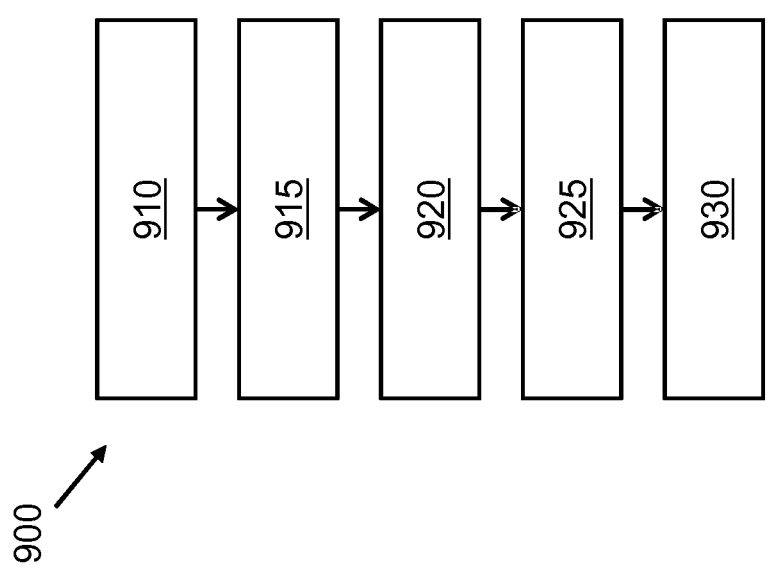
FIG. 17 shows a method of generating the composite video stream.

FIG. 17 shows a method 900 of composite video stream for being displayed by a client device. The method 900 may comprise, in a step titled "OBTAINING SPATIALLY SEGMENTED ENCODING OF BACKGROUND VIDEO", obtaining 910 a spatially segmented encoding of a background video, said segmented encoding comprising independently decodable background segments. The method 900 may further comprise, in a step titled "RECEIVING FOREGROUND VIDEO STREAM", receiving 915 at least one foreground video stream at least part of which is to be displayed in front of the background video. The method 900 may further comprise, in a step titled "DETERMINING PLACEMENT POSITION OF FOREGROUND VIDEO STREAM", determining 920 a placement position of the foreground video stream relative to the background video. The method 900 may further comprise, in a step titled "IDENTIFYING SUBSET OF BACKGROUND SEGMENTS", identifying 925 a subset of background segments which are partially or entirely occluded by the foreground video stream when the foreground video stream is displayed at the placement position. The method 900 may further comprise, in a step titled "GENERATING COMPOSITE VIDEO STREAM", generating 930 the composite video stream for the client device by, for a respective output frame of the composite video stream and respective input frames of the background video and the foreground video stream, i) selectively decoding the subset of background segments, thereby obtaining decoded background image data, ii) compositing image data of the foreground video stream into the decoded background image data, thereby obtaining composite image data, and iii) encoding the composite image data to obtain a set of independently decodable composite segments which, together with the background segments which are not in the subset of background segments, represent a spatially segmented encoding of the output frame of the composite video stream. As an (further) optional step which is not shown in FIG. 9, the method 900 may comprise streaming the composite video stream, or select spatial segments of the composite video stream, to the client device.

Figure 18:
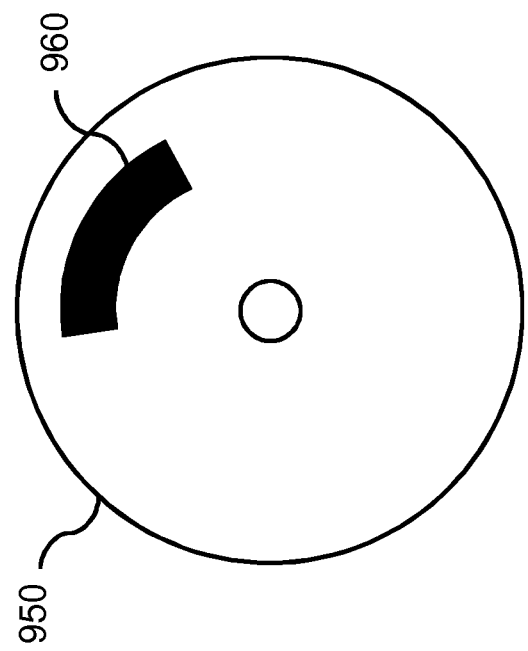
FIG. 18 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 950 as for example shown in FIG. 18, e.g., in the form of a series 960 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 18 shows by way of example an optical storage device 950.

In an alternative embodiment of the computer readable medium 950 of FIG. 18, the computer readable medium 950 may comprise transitory or non-transitory data 960 represent the placement metadata described in this specification.

Figure 19:
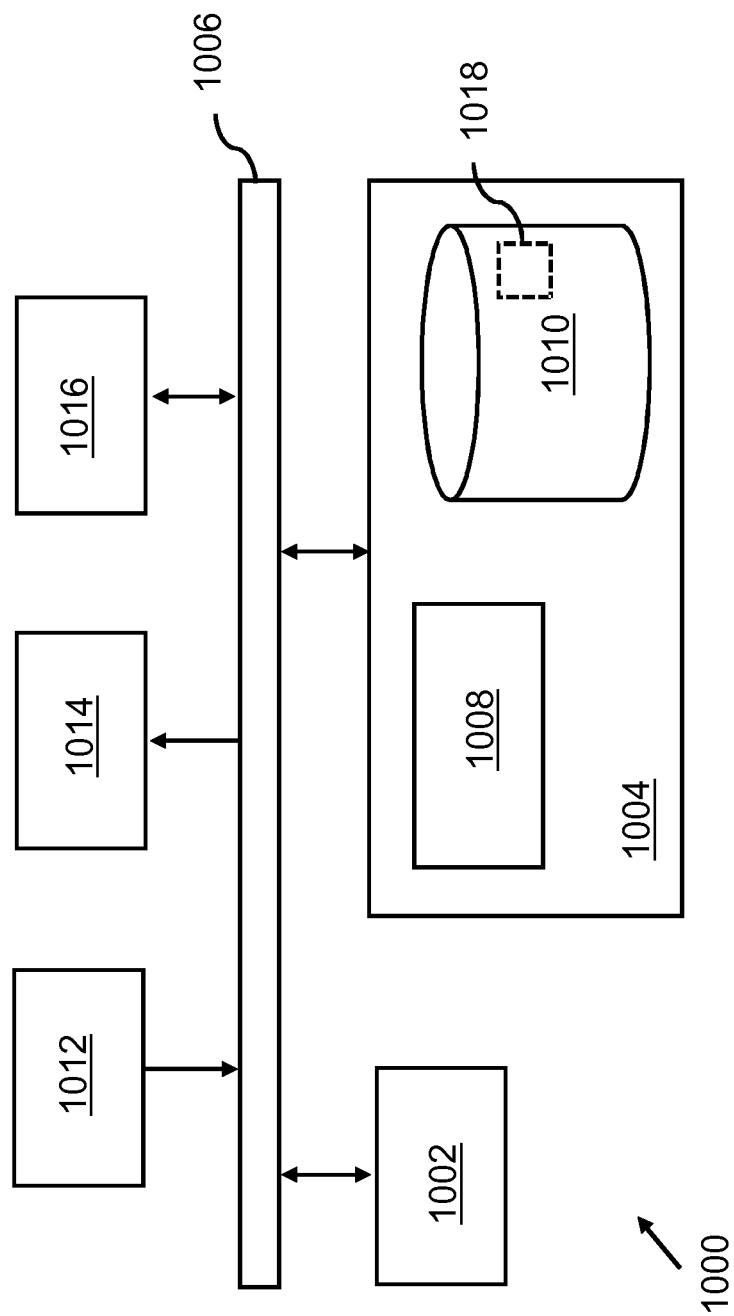
FIG. 19 shows an exemplary data processing system.

FIG. 19 is a block diagram illustrating an exemplary data processing system 1000 that may be used in the embodiments described in this specification. Such data processing systems include data processing entities described in this specification, including but not limited to the servers, client devices and processor systems as described with reference to FIGS. 3-18 and elsewhere, and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 19, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a processor system as described with reference to FIG. 15 or a server as described with reference to FIGS. 4-14. In that case, application 1018 may represent an application that, when executed, configures data processing system 1000 to perform the functions described with reference to said entity. In another example, data processing system 1000 may represent a processor system as described with reference to FIG. 16 or a client device as described with reference to FIGS. 4-14. In that case, application 1018 may represent an application that, when executed, configures data processing system 1000 to perform the functions described with reference to said entity.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of generating a composite video stream for being displayed by a client device, the method comprising another client device or a server performing:
   obtaining a spatially segmented encoding of a background video, said segmented encoding comprising independently decodable background segments;
   receiving at least one foreground video stream at least part of which is to be displayed in front of the background video;
   determining a placement position of the foreground video stream relative to the background video;
   identifying a subset of background segments which are partially or entirely occluded by the foreground video stream when the foreground video stream is displayed at the placement position;
   generating the composite video stream for the client device by, for a respective output frame of the composite video stream and respective input frames of the background video and the foreground video stream:
     selectively decoding the subset of background segments, thereby obtaining decoded background image data,
     compositing image data of the foreground video stream into the decoded background image data, thereby obtaining composite image data, and
     encoding the composite image data to obtain a set of independently decodable composite segments which, together with the background segments which are not in the subset of background segments, represent a spatially segmented encoding of the output frame of the composite video stream; and
   streaming the composite video stream, or spatial segments of the composite video stream which are within a field of view of a user of the client device, to the client device.

2. The method according to claim 1, wherein the client device is configured to display the composite video stream in a VR environment and to render the VR environment from a viewing position of a user, wherein the method further comprises:
   determining the viewing position of the user, for example by receiving data indicative of the viewing position from the client device; and
   identifying the subset of background segments which are partially or entirely occluded by the foreground video stream further based on the viewing position.

3. The method according to claim 1, further comprising: obtaining placement metadata associated with the spatially segmented encoding of the background video, wherein the placement metadata defines the placement position of the foreground video stream relative to the background video.

4. The method according to claim 1, wherein the spatially segmented encoding of the background video is obtained as a bitstream, and wherein the method further comprises:
   replacing the subset of background segments with the set of composite segments in the bitstream to obtain the spatially segmented encoding of the output frame of the composite video stream.

5. The method according to claim 1, wherein the spatially segmented encoding of the background video contains a map projection of the background video, and wherein the method further comprises:
   compositing the image data of the foreground video stream into the decoded background image data based on the map projection.

6. The method according to claim 5, wherein compositing the image data of the foreground video stream into the decoded background image data comprises applying the map projection to the image data of the foreground video stream before or when said image data is composited into the decoded background image data.

7. The method according to claim 5, wherein the map projection of the background video is an equirectangular projection.

8. The method according to claim 1, wherein the client device is configured to display the composite video stream in a VR environment and to render the VR environment in the field of view of the user, wherein the method further comprises:
   determining the field of view of the user in the VR environment; and
   compositing the image data of the foreground video stream into the decoded background image data based on the field of view.

9. The method according to claim 8, wherein compositing the image data of the foreground video stream into the decoded background image data based on the field of view comprises at least one of:
   only compositing the image data of the foreground video stream if said image data is in the field of view of the user; and
   compositing the image data of the foreground video stream at a reduced image quality if said image data is outside of the field of view of the user.

10. The method according to claim 1, wherein at least one of the spatially segmented encoding of the background video and the spatially segmented encoding of the composite video stream is represented by a tile-based media stream.

11. The method according to claim 1, further comprising:
   receiving a real-time foreground video stream from each one of a set of client devices, each respective foreground video steam representing a real-time recording of a respective user of a respective client device;
   for each one of the client devices, generating a composite video stream which comprises image data of the foreground video streams received from the other client devices composited into the background video at respective placement positions.

12. The method according to claim 1, wherein the server is an edge node of a 5G or next generation telecommunication network.

13. A non-transitory computer-readable medium comprising a computer program, the computer program comprising instructions for causing a processor system to perform the method according to claim 1.

14. A non-transitory computer-readable medium comprising placement metadata associated with a spatially segmented encoding of a background video, the placement metadata defining a placement position of at least one foreground video stream relative to the background video.

15. A processor system configured for generating a composite video stream for being displayed by a client device, the processor system comprising:
   a network interface to a network;
   an input interface for obtaining a spatially segmented encoding of a background video, said segmented encoding comprising independently decodable background segments;
   a processor configured to:
   via the network interface, receive at least one foreground video stream at least part of which is to be displayed in front of the background video;
   determine a placement position of the foreground video stream relative to the background video;
   identify a subset of background segments which are partially or entirely occluded by the foreground video stream when the foreground video stream is displayed at the placement position;
   generate the composite video stream for the client device by, for a respective output frame of the composite video stream and respective input frames of the background video and the foreground video stream:
      selectively decode the subset of background segments, thereby obtaining decoded background image data,
      composite image data of the foreground video stream into the decoded background image data, thereby obtaining composite image data, and
      encode the composite image data to obtain a set of independently decodable composite segments which, together with the background segments which are not in the subset of background segments, represent a spatially segmented encoding of the output frame of the composite video stream; and
   via the network interface, stream the composite video stream, or select spatial segments of the composite video stream which are within a field of view of a user of the client device to the client device.

16. A system comprising a processor system, a client device, and at least one other client device, wherein the processor system is configured for generating a composite video stream for being displayed by the client device, the processor system comprising:
   a network interface to a network;
   an input interface for obtaining a spatially segmented encoding of a background video, said segmented encoding comprising independently decodable background segments;

a processor configured to:
via the network interface, receive at least one foreground video stream from the at least one other client device, at least part of which is to be displayed in front of the background video;
determine a placement position of the foreground video stream relative to the background video;
identify a subset of background segments which are partially or entirely occluded by the foreground video stream when the foreground video stream is displayed at the placement position;
generate the composite video stream for the client device by, for a respective output frame of the composite video stream and respective input frames of the background video and the foreground video stream:
   selectively decode the subset of background segments, thereby obtaining decoded background image data,
   composite image data of the foreground video stream into the decoded background image data, thereby obtaining composite image data, and
   encode the composite image data to obtain a set of independently decodable composite segments which, together with the background segments which are not in the subset of background segments, represent a spatially segmented encoding of the output frame of the composite video stream; and
via the network interface, stream the composite video stream, or spatial segments of the composite video stream which are within the field of view of a user of the client device, to the client device; and wherein the client devices are configured to render a VR environment, each client device comprising:
a network interface to the network;
a processor configured to, via the network interface:
obtain a real-time recording of the user of the client device and stream the real-time recording as a foreground video stream to the processor system;
receive the composite video stream, or spatial segments of the composite video stream which are within the field of view of the user of the client device, from the processor system, the composite video stream being a spatially segmented encoding comprising a real-time recording of a user of another client device composited onto the background video;
the processor being further configured to:
decode at least part of the segments of the composite video stream, thereby obtaining decoded composite image data; and
render the decoded composite image data from a viewing position in the VR environment.

* * * * *

UNITED STATES PATENT AND TRADEMARK OFFICE
CERTIFICATE OF CORRECTION

PATENT NO. : 11,516,521 B2
APPLICATION NO. : 17/262598
DATED : November 29, 2022
INVENTOR(S) : Alexandre da Silva Pratas Gabriel, Mattijs Oskar Van Deventer and Hans Maarten Stokking It is certified that error appears in the above-identified patent and that said Letters Patent is hereby corrected as shown below:

In the Claims

In Claim 15, Column 26, Line 55 please delete the word "select".

Signed and Sealed this
Fourteenth Day of February, 2023

Katherine Kelly Vidal
*Director of the United States Patent and Trademark Office*